United States Patent
Seger

(10) Patent No.: US 9,686,311 B2
(45) Date of Patent: *Jun. 20, 2017

(54) INTERDICTING UNDESIRED SERVICE

(71) Applicant: Palo Alto Networks, Inc., Santa Clara, CA (US)

(72) Inventor: Robert Seger, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,247

(22) Filed: Jul. 20, 2015

(65) Prior Publication Data

US 2015/0326590 A1    Nov. 12, 2015

Related U.S. Application Data

(63) Continuation of application No. 13/915,585, filed on Jun. 11, 2013, now Pat. No. 9,124,625.

(51) Int. Cl.
*G06F 21/55* (2013.01)
*H04L 29/06* (2006.01)
*G06F 21/56* (2013.01)
*G06F 21/57* (2013.01)

(52) U.S. Cl.
CPC .......... *H04L 63/145* (2013.01); *G06F 21/552* (2013.01); *G06F 21/56* (2013.01); *G06F 21/577* (2013.01); *H04L 63/1433* (2013.01)

(58) Field of Classification Search
CPC .......... H04L 29/06027; H04L 43/0811; H04L 41/5009; H04L 43/0888; H04L 45/02; H04L 45/16; H04L 45/26; H04L 47/32; H04L 61/20; H04L 63/1408; H04L 2463/146; H04L 49/201; H04W 12/06; H04W 40/246
See application file for complete search history.

*Primary Examiner* — Saleh Najjar
*Assistant Examiner* — Oleg Korsak
(74) *Attorney, Agent, or Firm* — Van Pelt, Yi & James LLP

(57) ABSTRACT

Interdicting an undesired service is disclosed. For example, a malware service is interdicted. The undesired service is identified. A vulnerability of the undesired service is identified from among a hierarchy of vulnerabilities. The undesired service is interdicted according to the vulnerability. For example, a corresponding action of a vulnerability to interdict the undesired service is performed in the order of the hierarchy until the undesired service is interdicted.

20 Claims, 11 Drawing Sheets

INTERDICTING UNDESIRED SERVICE

CROSS REFERENCE TO OTHER APPLICATIONS

This application is a continuation of co-pending U.S. patent application Ser. No. 13/915,585, entitled INTERDICTING UNDESIRED SERVICE filed Jun. 11, 2013 which is incorporated herein by reference for all purposes.

BACKGROUND OF THE INVENTION

Corporations, government agencies, and personal users are suffering from wholesale data exfiltration, privacy breaches, and system downtime due to attacks from malicious software or malware. Networks often utilize a layered defense to malware attacks, which includes antivirus software, firewalls, and intrusion protection systems. Malware implants are often stored in a computer system without the knowledge or consent of the operator of the computer system. The majority of current network security solutions detect malware using heuristic signature-based detection. Signature-based detection consists of searching for known patterns of data in storage. Since signature-based detection systems focus on specific malware characteristics for discovery, such systems often require constant scanning of large amounts of data using host-based programs such as antivirus software that consume storage and processing resources of the computer system. Additionally, it is difficult for traditional signature-based detection systems to detect new malware that has not been analyzed and stored in a signature database. In some cases, a malware may lie dormant until it is remotely activated (e.g., to transmit data of the infected host to a remote location). A traditional malware detection system may be able to only detect the dormant malware only after it becomes active in memory and causes damage. Once malware or any other unwanted service has been identified, it is often difficult to effectively and efficiently stop the unwanted service. Therefore, there exists a need for a way to effectively and efficiently stop an unwanted service.

BRIEF DESCRIPTION OF THE DRAWINGS

Various embodiments of the invention are disclosed in the following detailed description and the accompanying drawings.

DETAILED DESCRIPTION

Figure 1:
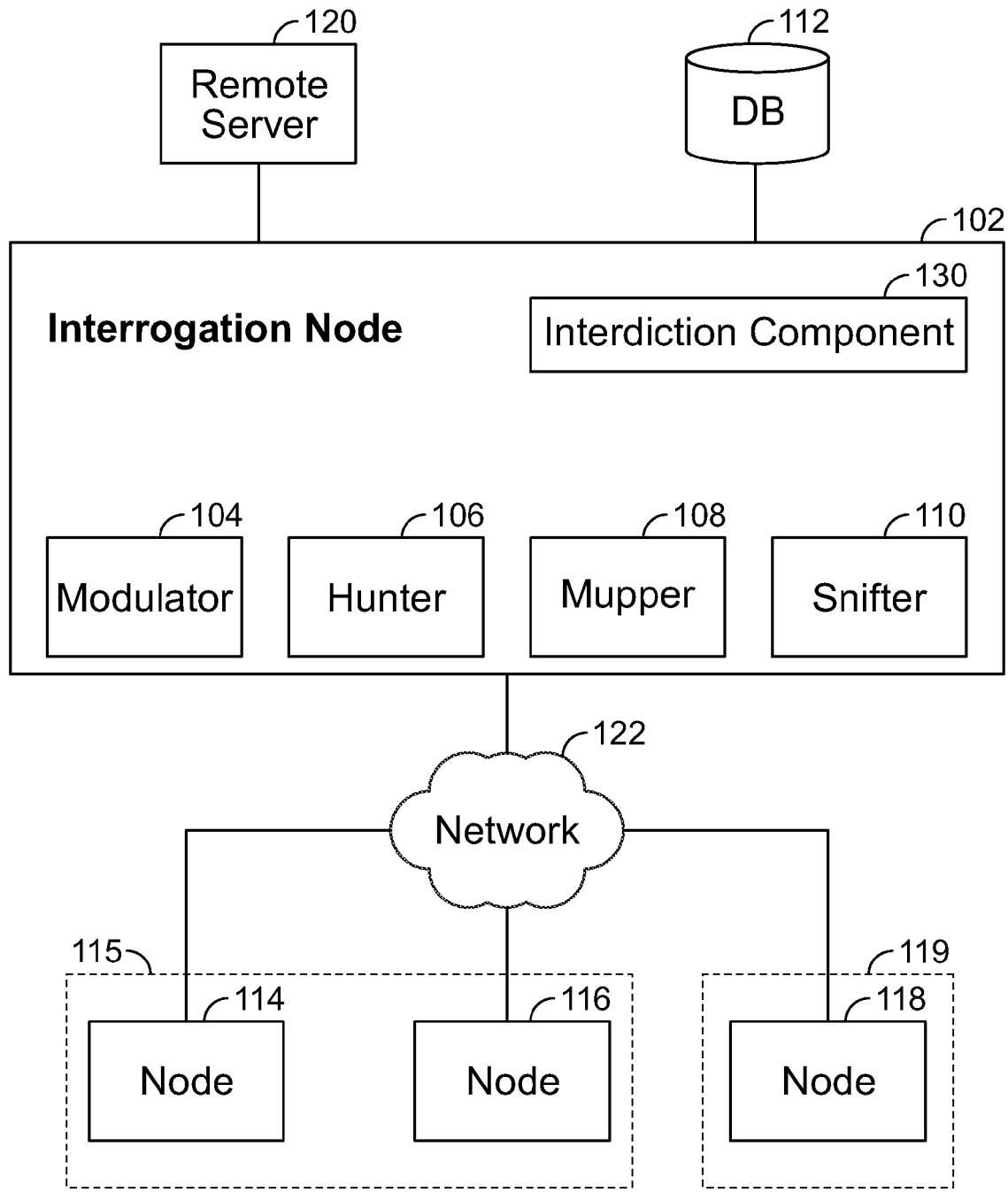
FIG. 1 is a block diagram illustrating an embodiment of a network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Interdicting an undesired service is disclosed. In some embodiments, an undesired service is identified. For example, a malware service to be interdicted is identified by identifying a behavior of a service that is associated with an undesired service. A vulnerability of the undesired service is identified from among a hierarchy of vulnerabilities. For example, there exists a hierarchy of actions (e.g., each exploiting a vulnerability) that may be performed in order to interdict the undesired service. An order of the hierarchy may be associated with desirability and/or efficiency of the action. For example, it may be preferable to stop the undesired service rather than stop an entire node/computer providing the service and stopping the service is ranked higher in the hierarchy than stopping the node. Not all actions to interdict the undesired service may be effective on the undesired service, and the vulnerabilities of the undesired service that allow one or more actions to be utilized are identified. The undesired service is interdicted according to the vulnerability. For example, a corresponding action of a vulnerability to interdict the undesired service is performed in the order of the hierarchy until the undesired service is interdicted.

In some embodiments, in order to identify an unwanted service, a behavior or a service (e.g., malware behavior/ service) of a network node is discovered. In some embodiments, a plurality of predetermined interrogation packets that correspond to a plurality of hypotheses is sent. Each hypothesis corresponds to a potential behavior and/or network/application service (e.g., malware behavior/service) that may be operating on a port of a network node, and a predetermined interrogation packet invites an expected action that confirms the operation of a particular behavior/service being tested with the associated hypothesis. For example, ports of a device on a network have been scanned to determine which ports of the device are operating a listening service. In order to determine which exact service or a behavior of the listening service is operating on the port, a hypothesis is determined on which exact service and/or behavior may be operating on the port, and the hypothesis is tested by sending an interrogation packet that is expected to produce an expected action if the hypothesis is correct. In some embodiments, the expected action is detected and it is determined that the behavior/service of the hypothesis is operating. In some embodiments, by sending the interrogation packets, a malware that may otherwise lie dormant is activated to enable early detection of the malware before the malware is later undesirably activated to cause damage.

FIG. 1 is a block diagram illustrating an embodiment of a network environment. Interrogation node 102 is connected to nodes 114, 116, and 118 via network 122. For example, interrogation node 102 and nodes 114, 116, and 118 are a part of the same internal network (e.g., intranet). In some embodiments, it is desired to discover the existence of devices 114, 116, and 118 that are connected to network 122. In some embodiments, it is desired to interdict an unwanted service of devices 114, 116 and/or 118. In some embodiments, interrogation node 102 discovers and/or interdicts listening services that are operating on nodes/devices of a network. For example, interrogation node 102 detects and interdicts malware operating on one or more nodes of network 122. In some embodiments, malware detection/interdiction and/or device/node discovery functionality of interrogation node 102 may be performed without requiring network nodes (e.g., nodes 114-118) to install specialized program/code for the functionality. For example, interrogation node 102 is added as a node (e.g., virtual appliance) of the network to be analyzed, and interrogation node 102 self-configures itself for the network and automatically discovers services/malware/nodes by querying nodes of the network.

Node 114 and node 116 belong to multicast group 115 and node 118 belongs to multicast group 119. For example, a single multicast packet sent to multicast group 115 will be delivered to both nodes 114 and 116. Interrogation node 102 includes components modulator 104, hunter 106, mapper 108 and sniffer 110. Modulator 104 attempts to discover nodes of network 122. For example, modulator 104 sends packets that require a response to be provided and tracks responses from nodes (e.g., nodes 114, 116, and 118) to identify the existence of the nodes. Hunter 106 port scans the nodes discovered by mapper 108. For example, hunter 106 discovers the existence of listening services operating on ports of each node discovered by mapper 108. Modulator 104 attempts to identify a specific behavior and/or service/application operating on the ports discovered by hunter 106. Sniffer 110 receives and handles responses to packets sent by modulator 104, hunter 106, and/or mapper 108. For example, mapper 108 sends multiple packets successively without waiting for responses to the packets and the responses to the sent packets are received and handled by sniffer 110.

Interrogation node 102 includes interdiction component 130 that interdicts one or more services operating on one or more nodes of network 122. For example, one or more services discovered by modulator 104 are attempted to be interdicted by interdiction component 130. Interdiction component 130 may be able to interdict one or more undesired services (e.g., malware) of nodes 114, 116 and/or 118 without being installed on and/or processing every communication packet of nodes 114, 116 and/or 118 and/or services of nodes 114, 116 and/or 118. In other embodiments, interdiction component 130 is not included in interrogation node 102. For example, interdiction component 130 is included in another node of network 122. In some embodiments, interdiction component 130 is included in remote server 120. In some embodiments, using interdiction component 130, one or more undesired services hosted by one or more nodes (e.g., host nodes 114, 116 and/or 118) of network 122 can be interdicted (e.g., undesired service is terminated) without interdiction component 130 being installed on a host node or having interdiction component 130 monitor every network traffic of the host node. For example, interdiction component 130 and/or a hardware component that includes interdiction component 130 is not a part of a hardware that includes a host of the undesired service and is not placed in-line with network traffic flow of the host.

Interrogation node 102 is connected to database 112. Database 112 may include data associated with one or more of the following: discovered nodes of a network stored by mapper 108, ports with listening services discovered by hunter 106, behavior/service identified by modulator 104, hypothesis used by modulator 104 to identify behavior/service of a listening service, and a signature of a known behavior/service/malware. Remote server 120 is connected to interrogation node 102 and may provide node 102 with software updates, instructions, packets to be sent, and/or commands and may receive interrogation responses, analysis results, and/or operation information. For example, remote server 120 may be located external to an internal network (e.g., external to network 122) and may be used to remotely control and/or operate interrogation node 102. Interrogation node 102 may utilize other components connected to network 122 to perform one or more functions. For example, information may be obtained by node 102 from a network administrator and/or a Dynamic Host Configuration Protocol (i.e., DHCP) server.

Although the example of FIG. 1 shows interrogation node 102 directly connected to remote server 120 and database 112, in some embodiments, remote server 120 and/or database 112 is connected to network 122 and interrogation node 102 accesses remote server 120 and/or database 112 via network 122. In some embodiments, remote server 120 and/or database 112 is accessible via a public network such as the Internet and interrogation node 102 accesses remote server 120 and/or database 112 via the public network. Examples of nodes 114, 116, and 118 include a physical network device and a virtual network device. Examples of interrogation node 102 include a physical network device, a virtual network device, and a software component of a network node (e.g., a software component of a physical network device represented as node 114). In some embodiments, functionality of interrogation node 102 and one or more of its components is offered as Software-as-a-Service (i.e., SAAS), and interrogation node 102 allows services of remote server 120 to be accessed by one or more devices connected to network 122.

Examples of network 122 include one or more of the following: a direct or indirect physical communication connection, mobile communication network, a virtual network, Internet, intranet, Local Area Network, Wide Area Network, Storage Area Network, and any other form of connecting two or more systems, components, or storage devices together. In some embodiments, network 122 is an intranet network and network 122 allows access to an external network separated by a firewall. In various embodiments, the components shown in FIG. 1 may exist in various combinations of hardware machines. One or more of the components shown in FIG. 1 may be included in the same machine. Although the example of FIG. 1 shows interdiction component 130, modulator 104, hunter 106, mapper 108, and sniffer 110 included in interrogation node 102, these components may exist in one or more different hardware devices. Other communication paths may exist and the example of FIG. 1 has been simplified to illustrate the example clearly. Although single instances of components have been shown to simplify the diagram, additional instances of any of the components shown in FIG. 1 may exist. For example, multiple modulators, hunters, mappers, and sniffers may exist in interrogation node 102. Multiple interrogation nodes may exist. Other nodes may be connected to network 122. Multicast groups 115 and 119 may include others not shown in FIG. 1. Components not shown in FIG. 1 may also exist. For example, other types of devices may be connected to network 122.

Figure 2:
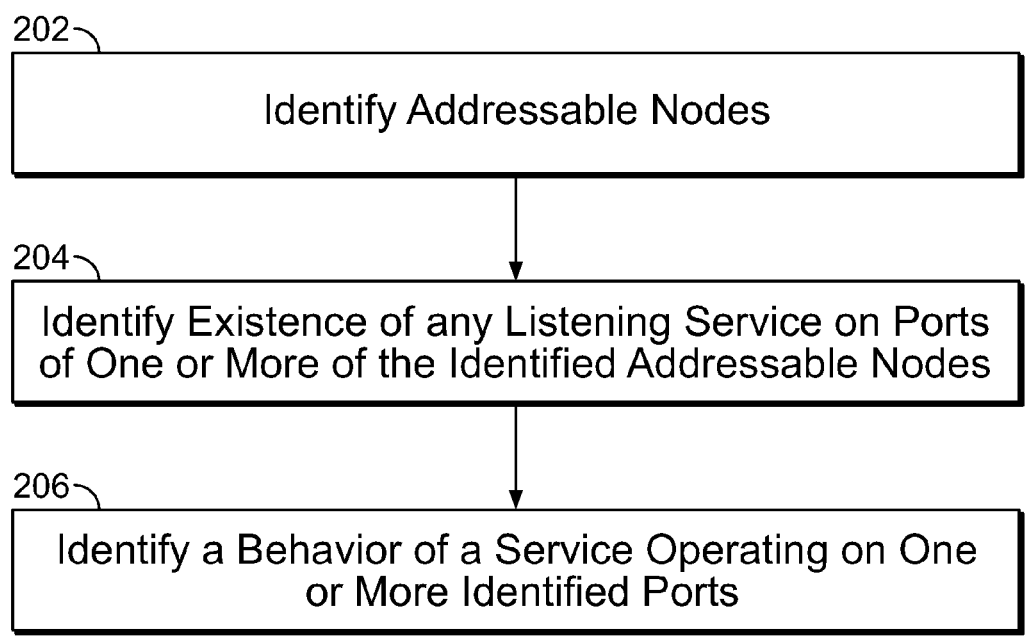
FIG. 2 is a flowchart illustrating a process for discovering nodes of a network.

FIG. 2 is a flowchart illustrating a process for discovering nodes of a network. The process of FIG. 2 may be at least in part implemented on interrogation node 102 and/or remote server 120 of FIG. 1.

At 202, addressable nodes are identified. In some embodiments, step 202 is performed at least in part by mapper 108 and/or sniffer 110 of FIG. 1. For example, response request packets are sent by mapper 108, and sniffer 110 receives responses to the response request packets. In some embodiments, determining the addressable nodes includes attempting to discover nodes that are connected to a network. For example, a listing of all discoverable devices/nodes connected to the network is attempted to be determined. In some embodiments, identifying the addressable nodes includes attempting to discover nodes connected to the network with an Internet Protocol (i.e., IP) address that belongs to the network. In some embodiments, identifying the addressable nodes includes identifying nodes that are confirmed to be addressable by an IP address associated with a network (e.g., discover nodes that are part of the same intranet). In some embodiments, identifying the addressable nodes includes providing a request for a response to one or more addresses of a network and receiving a reply that indicates that an addressable node exists at the address of the network. In some embodiments, identifying the addressable nodes includes determining nodes that are addressable by Internet Protocol version 4 (i.e., IPv4) addresses and/or IPv6 addresses. The addressable nodes may be identified continually and/or periodically. For example, nodes that belong to a network may dynamically change, and the changes are tracked by periodically identifying addressable nodes. In some embodiments, identifiers of the identified addressable nodes are stored. For example, IP addresses of the addressable nodes are stored in database 112 of FIG. 1.

At 204, existence of any listening service on ports of one or more of the identified addressable nodes is identified. In some embodiments, step 204 is performed at least in part by hunter 106 and/or sniffer 110 of FIG. 1. For example, port scanning packets are sent by hunter 106, and sniffer 110 receives responses to the port scanning packets. In some embodiments, identifying the existence of listening services includes port scanning each of the nodes identified at 202. For example, port scanning packets are sent to every port of each of the nodes identified at 202. In some embodiments, identifying the existence of the listening service includes identifying ports that are associated with a service that provides a response packet in response to a port scanning packet provided to the port. In some embodiments, port scanning is performed continually and/or periodically. For example, services operating on ports of a network node machine may dynamically change, and changes are tracked by periodically scanning the ports of the network node. In some embodiments, identifiers of identified ports with listening services are stored. For example, port numbers of the addressable nodes are stored in database 112 of FIG. 1.

At 206, a behavior of a service operating on one or more identified ports is identified. In some embodiments, the behavior of the service includes operation of the service. In some embodiments, step 206 is performed at least in part by modulator 104 and/or sniffer 110 of FIG. 1. For example, interrogation packets are sent by modulator 104, and sniffer 110 receives responses to the interrogation packets. In some embodiments, identifying the behavior of the service includes providing interrogation packets that invite a certain response that can be used to identify a specific behavior and/or service operating on a port. For example, in order to identify a specific behavior and/or service operating on a port identified in 204, a plurality of interrogation packets that correspond to a plurality of hypotheses are sent to the port. If an expected response is received in response to an interrogation packet, a specific behavior and/or specific service tested by the interrogation packet is determined to be potentially operating on the port. In some embodiments, a confidence indicator indicating a level/degree of confidence that the behavior/service determined to be potentially operating on the port is determined. In some embodiments, each port identified in 204 is analyzed at 206 by sending interrogation packets to the port. In some embodiments, if more than one expected action is detected from a port in response to more than one interrogation packet, a hierarchical ordering of identifiable behavior/service may be used to identify a single behavior and/or service operating on a port. For example, if it is determined that two different services may be operating on a port, a service with a higher hierarchy may be chosen as the service that is identified as operating on the port. In some embodiments, if more than one expected action is detected from a port in response to more than one interrogation packet, a confidence indicator may be used to identify a single behavior and/or service operating on a port. For example, the identification with a higher confidence indicator is selected.

In some embodiments, the identification in 206 is performed continually and/or periodically. For example, services operating on ports of a network node may dynamically change, and identification of a behavior/service operating on the ports is updated. In some embodiments, the identification in 206 is performed dynamically when a port is identified in 204. In some embodiments, identifiers of identified behavior and/or service are stored. For example, behavior/service identifiers are stored in database 112 of FIG. 1. In some embodiments, a result of the identification in 206 is used to generate a table/listing of services operating on ports of network nodes of a network.

In some embodiments, a level/degree of threat the identified behavior/service is associated with a malware is determined. In some embodiments, an identified threat level/degree is stored in a data structure such as database 112 of FIG. 1. In some embodiments, if the behavior/service is potentially associated with a malware, an indication is provided. For example, if the determined level/degree of threat meets a threshold value, an alert is provided to a network administrator.

Figure 3:
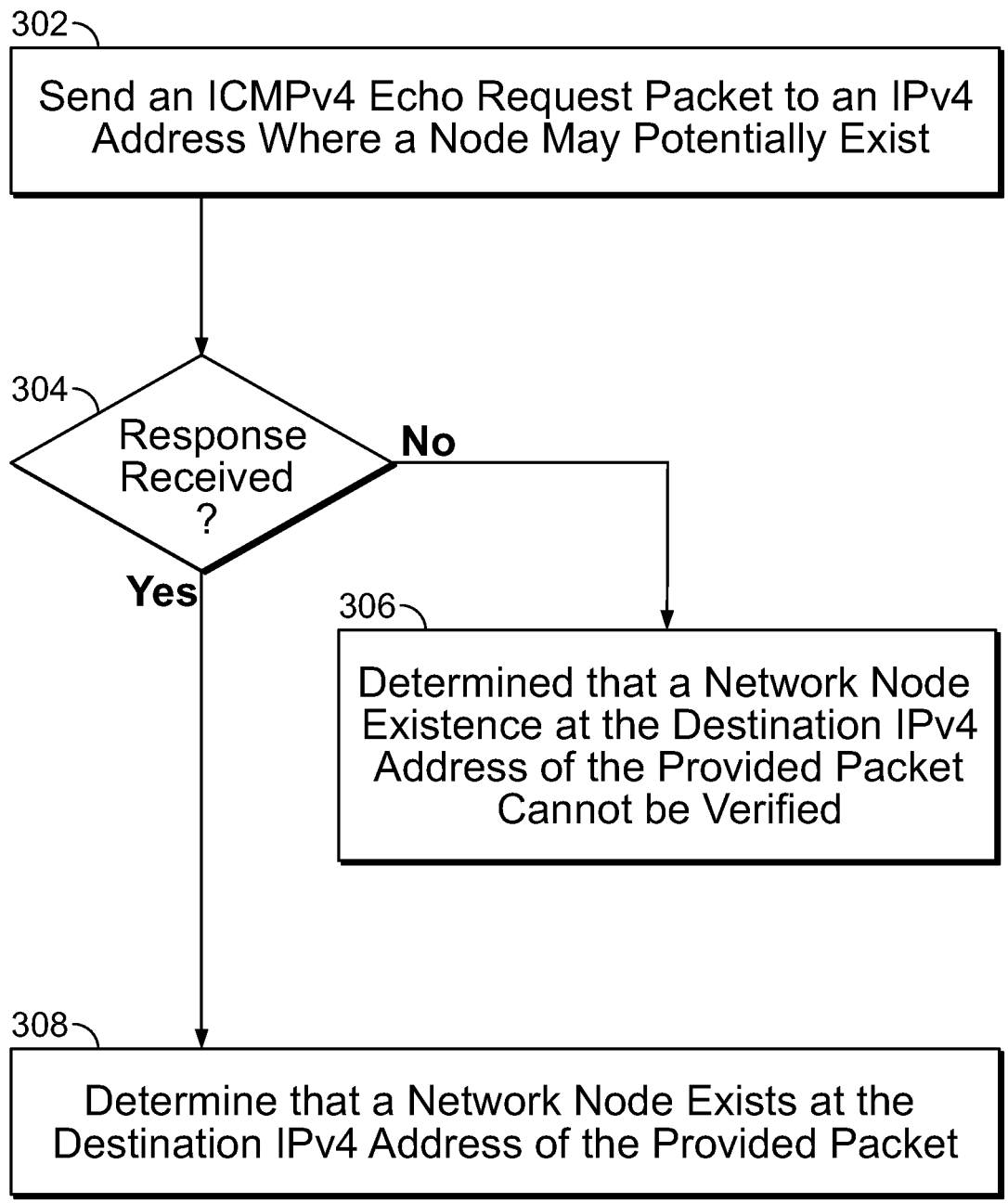
FIG. 3 is a flow chart illustrating a process for discovering IPv4 addressable nodes of a network.

FIG. 3 is a flow chart illustrating a process for discovering IPv4 addressable nodes of a network. The process of FIG. 3 may be at least in part implemented on interrogation node 102, remote server 120, mapper 108, and/or sniffer 110 of FIG. 1. In some embodiments, the process of FIG. 3 is included in 202 of FIG. 2.

At 302, an Internet Control Message Protocol version 4 (i.e., ICMPv4) echo request packet (e.g., ping request packet) is sent to an IPv4 address where a node may potentially exist. In some embodiments, the IPv4 address may be one of a plurality of IP addresses where the ICMPv4 echo request is sent. For example, each IP address in a range of IP addresses determined to be associated with a subject network to be analyzed is sent an ICMPv4 echo request packet.

At 304, it is determined whether a response has been received in response to the echo request packet. In some embodiments, determining whether the response has been received includes determining whether a response packet has been received from a node at the destination IPv4 address of the echo request packet. In some embodiments, a network node that receives an ICMPv4 echo request packet may provide a response but is not required to provide a response.

If it is determined at 304 that a response has not been received, at 306 it is determined that a network node existence at the destination IPv4 address of the provided packet cannot be verified. In some embodiments, if the determination at 306 is made, a determination is made that a network node likely does not exist at the destination IPv4 address. In some embodiments, if the determination at 306 is made, a determination is made that a network node may potentially exist at the destination IPv4 address and may be configured to intentionally not respond to the ICMPv4 echo request packet. For example, if the determination at 306 is made, the destination IPv4 address is identified/stored to indicate that further analysis (e.g., performed at 204 of FIG. 2) of a potential node located at the IPv4 address should be performed.

If it is determined at 304 that a response has been received, at 308 it is determined that a network node exists at the destination IPv4 address of the provided packet. In some embodiments, if the determination at 308 is made, the destination IPv4 address is identified/stored to indicate that further analysis (e.g., performed at 204 of FIG. 2) of the node located at the IPv4 address should be performed.

Figure 4:
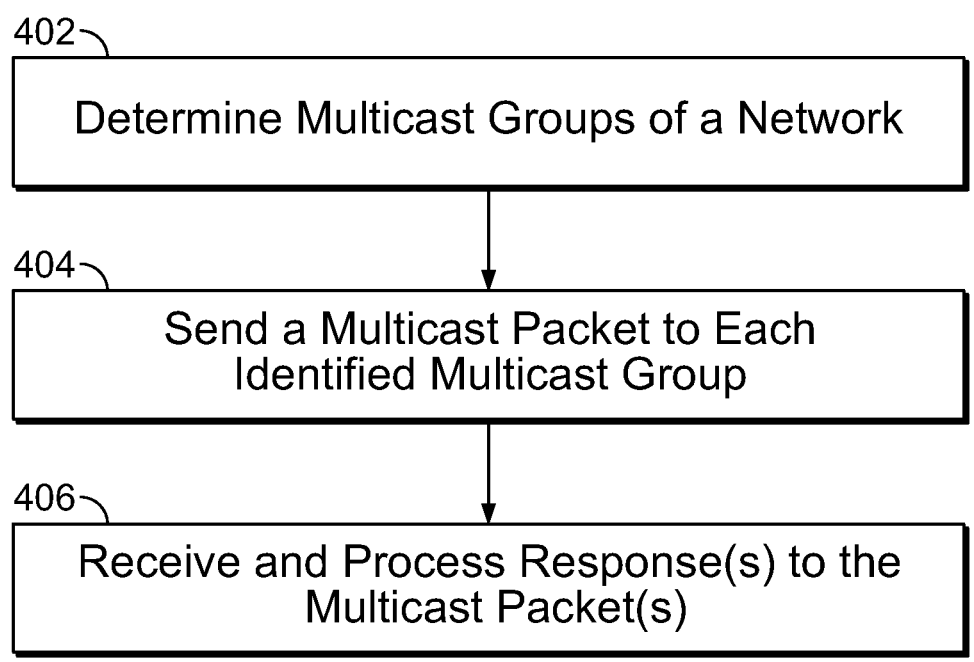
FIG. 4 is a flowchart illustrating a process for discovering IPv6 addressable nodes of a network.

FIG. 4 is a flowchart illustrating a process for discovering IPv6 addressable nodes of a network. The process of FIG. 4 may be at least in part implemented on interrogation node 102, remote server 120, mapper 108, and/or sniffer 110 of FIG. 1. In some embodiments, the process of FIG. 4 leverages a specific requirement of the IPv6 protocol standard that is not present and could not leverage with the IPv4 protocol. The process of FIG. 4 may allow IPv6 address space of a subject network to be mapped efficiently and completely. In some embodiments, the process of FIG. 4 is included in 202 of FIG. 2. In some embodiments, the process of FIG. 4 is used to discover nodes/devices of an IPv6 network to allow efficient management of the network. For example, the process of FIG. 4 is used to determine a list of nodes/devices connected to a network and the list is used to analyze network utilization and perform network planning.

At 402, multicast groups of a network are determined. For example, existence of multicast groups of a network such as group 115 and group 119 of network 122 in FIG. 1 is determined. In some embodiments, a multicast group includes a grouping of one or more addresses (e.g., IPv6 addresses) that have been grouped together for network management purposes. A communication (e.g., a packet) sent to a multicast group (e.g., sent to an identifier/address) may be provided to a plurality of member addresses belonging to the multicast group. In some embodiments, determining the multicast groups includes receiving an identification of multicast groups. For example, a network administrator provides a list of multicast groups of a network to be analyzed. In some embodiments, determining the multicast groups includes querying a Dynamic Host Configuration Protocol (i.e., DHCP) server and/or another network management server of the network to obtain an identification of the multicast group of the network.

In some embodiments, if a listing of multicast groups of the network cannot be obtained from one or more sources, identification of the multicast groups is dynamically determined. For example, a multicast group identifier assigned to an interrogation node such as node 102 of FIG. 1 is used as an initial multicast group identifier and the initial multicast group identifier is iteratively incremented and decremented and verified for existence of a valid multicast group at the incremented/decremented identifier until bounding limits of a valid range of multicast group identifiers are found. For example, identifier/addresses (e.g., group number included in an address) of multicast groups may be numerically contiguous and the upper and lower bounds of the multicast group address range are determined by iteratively testing incremented/decremented multicast group addresses starting from an initially known to be valid multicast group address.

At 404, a multicast packet is sent to each identified multicast group. In some embodiments, the multicast packet is an IPv6 packet sent to a multicast group address. Because all nodes with an IPv6 address belong to a multicast group and the multicast packet sent in 404 will be distributed to all members of the multicast group, all nodes of a subject network may be reached by sending packets to all multicast groups. In some embodiments, the IPv6 packet specifies a required option that will not be recognized by a receiver of the packet. For example, the IPv6 packet includes one or more extension headers that encode optional internet-layer information. Each extension header may identify any number of options. The option may be specified in the extension header by an option type identifier (e.g., an 8-bit identifier of the type of option), an option data length identifier (e.g., an 8-bit integer identifying a length of option data), and an option data (e.g., a variable length field with data of the option).

The option type identifier of the option is encoded in a manner such that the highest order two bits specify an action that must be taken if the node processing of the IPv6 packet does not recognize the option type. If the highest order two bits are "00," then the option should be skipped over and the rest of the header should be processed. If the highest order two bits are "01," then the packet should be discarded. If the highest order two bits are "10," then the packet should be discarded, and regardless of whether or not the packet's Destination Address was a multicast address, an Internet Control Message Protocol version 6 (i.e., ICMPv6) Parameter Problem, Code 2, message is to be provided to the packet's Source Address, pointing to the unrecognized Option Type. If the highest order two bits are "01," it specifies that the packet should be discarded and only if the packet's Destination Address was a multicast address, an ICMPv6 Parameter Problem, Code 2, message is to be sent to the packet's Source Address, pointing to the unrecognized Option Type. In some embodiments, the multicast packet sent in 404 specifies an option type (e.g., highest order two bits are "10") that requires a message to be provided by a receiver of the packet if the option type cannot be recognized and the option type is known to be an invalid option type. For example, a multicast packet sent in 404 specifies an option type with the first highest order two bits that are "10" and the rest of the bits specify values that do not correspond to a valid option type. A receiver of this packet is required by the IPv6 protocol to provide an ICMPv6 Parameter Problem, Code 2, message. By tracking which node has provided this ICMPv6 message, nodes of an IPv6 network may be determined.

At 406, response(s) to the multicast packet(s) are received and processed. In some embodiments, the response includes an ICMPv6 message/packet that includes a header with a type field (e.g., 8-bit value specifying the type of the message) and a code field (e.g., 8-bit value that further specifies a sub-type of the identified type in the type field). In some embodiments, the multicast packet sent in 404 invites an ICMPv6 Parameter Problem, Code 2, response message (e.g., message with type field value "4" specifying a Parameter Problem message and a code field value "2" that specifies "unrecognized IPv6 option encountered" reason for the Parameter Problem message) from a node that received the multicast packet. In some embodiments, a response is expected from every valid node with an IPv6 address that received the multicast packet(s) sent to the multicast group(s). In some embodiments, based at least in part on whether a response has been received from a node belonging to a particular multicast group, an additional multicast group(s) to send the multicast packet is determined.

In some embodiments, starting from an initial multicast group number known to be valid (e.g., multicast group number belonging to a sender of the multicast packet), a multicast group number is iteratively incremented (e.g., to determine an upper bound of a valid range of multicast group numbers) and used in destination multicast group addresses to be sent the multicast packet as long as the incremented group number is determined to be valid because a response has been received in response to the multicast packet sent to the address of the incremented group number. When a multicast packet sent to an incremented group number does not generate a response packet, an upper bound on the valid range of multicast groups may have been reached and the multicast group number is no longer iteratively incremented and used to send the multicast packet.

In some embodiments, starting from an initial multicast group number known to be valid (e.g., multicast group number belonging to a sender of the multicast packet), a multicast group number is iteratively decremented (e.g., to determine a lower bound of a valid range of multicast group numbers) and used in destination multicast group addresses to be sent the multicast packet as long as the decremented group number has not reached zero and is determined to be valid because a response has been received in response to the multicast packet sent to the address of the decremented group number. When a multicast packet sent to a decremented group number does not generate a response packet, a lower bound on the valid range of multicast groups may have been reached and the multicast group number is no longer iteratively decremented and used to send the multicast packet.

In some embodiments, processing the response(s) to the multicast packet(s) includes storing an identifier of one or more nodes that provided the response(s). For example, an identifier of the node (e.g., IP address) is stored in a data structure such as database 112 of FIG. 1. The identifier may be used to identify which nodes exist in a network. In some embodiments, the identifier is used to identify a node to be analyzed at 204 of FIG. 2.

In some embodiments, processing the response(s) to the multicast packet(s) includes determining changes to nodes of a subject network. For example, the process of FIG. 4 is continually/periodically performed and any new node that is added to the network and/or any removed node since the last execution of the process of FIG. 4 is identified. In some embodiments, if a new node is detected, in order to detect unauthorized nodes on the network, it is determined whether the new node is authorized to be on the network. For example, the new node is analyzed to determine whether the new node is included in a whitelist of authorized nodes, is included in a blacklist of unauthorized nodes, can present an authorization (e.g., authorization token), is of a type that is authorized to access the network, and/or is associated with a valid user. By comparing an identification of a new node with an identification of a removed node, it may be determined that the new node is not actually a new node but merely moved within the network. For example, the node may have moved to a different network grouping because the node is now utilizing a different network access point. In some embodiments, if a previously existing node is no longer detected, it is determined whether the node has failed and/or a failover of the node is performed. For example, the node may be providing a networked service and when it is detected that the node is no longer a part of the network, the service being provided by the removed node is transferred to a different node of the network.

Figure 5:
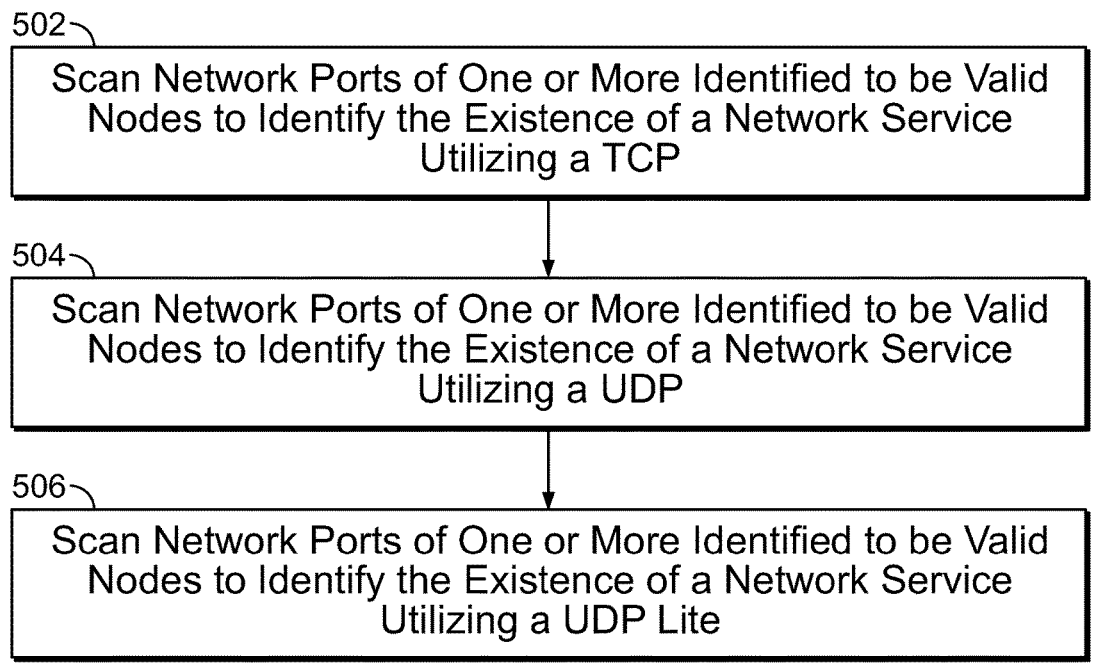
FIG. 5 is a flowchart illustrating an embodiment of a process for discovering the existence of listening services on ports of one or more of the identified addressable nodes.

FIG. 5 is a flowchart illustrating an embodiment of a process for discovering the existence of listening services on ports of one or more of the identified addressable nodes. The process of FIG. 5 may be at least in part implemented on interrogation node 102, remote server 120, hunter 106, and/or sniffer 110 of FIG. 1. In some embodiments, the process of FIG. 5 is included in 204 of FIG. 2. In some embodiments, the process of FIG. 5 includes port scanning one or more valid nodes identified at 202 of FIG. 2, the process of FIG. 3 and/or the process of FIG. 4.

At 502, network ports of one or more identified to be valid nodes are scanned to identify the existence of a network service utilizing a Transmission Control Protocol (i.e., TCP). In some embodiments, the identified to be valid nodes are nodes identified at 202 of FIG. 2, the process of FIG. 3 and/or the process of FIG. 4. In some embodiments, a TCP synchronized (i.e., "SYN") packet is sent to every TCP port of one or more identified to be valid node(s) to initiate a communication handshake. In response, for each port, the node may (1) provide a response that indicates no listening service exists on the port and the handshake cannot be initiated, (2) provide no response, or (3) provide a "SYN ACK" packet that indicates that a listening service exists on the port. In some embodiments, ports that provide either the "SYN ACK" packet or provide no response are identified (e.g., port identifier(s) are stored in a data structure such as database 112 of FIG. 1) for further examination (e.g., at 206 of FIG. 2).

At 504, network ports of one or more identified to be valid nodes are scanned to identify the existence of a network service utilizing a User Datagram Protocol (i.e., UDP). In some embodiments, the identified to be valid nodes are nodes identified at 202 of FIG. 2, the process of FIG. 3 and/or the process of FIG. 4. In some embodiments, a UDP packet is sent to every UDP port of one or more identified to be valid node(s). In response for each port, the node may (1) provide an ICMP packet response that indicates no listening service exists on the port and the port is unreachable, (2) provide no response, or (3) provide a confirmation response that indicates a listening service exists on the port. In some embodiments, ports that provide either a confirmation response packet or provide no response are identified (e.g., port identifier(s) are stored in a data structure such as database 112 of FIG. 1) for further examination (e.g., at 206 of FIG. 2).

At 506, network ports of one or more identified to be valid nodes are scanned to identify the existence of a network service utilizing a User Datagram Protocol Lite (i.e., UDP Lite). In some embodiments, the identified to be valid nodes are nodes identified at 202 of FIG. 2, the process of FIG. 3 and/or the process of FIG. 4. In some embodiments, a UDP Lite packet is sent to every UDP Lite port of one or more identified to be valid node(s). In response for each port, the node may (1) provide an error response that indicates no listening service exists on the port and the port is unreachable, (2) provide no response, or (3) provide a confirmation response that indicates a listening service exists on the port. In some embodiments, ports that provide either a confirmation response packet or provide no response are identified (e.g., port identifier(s) are stored in a data structure such as database 112 of FIG. 1) for further examination (e.g., at 206 of FIG. 2).

In some embodiments, at least a portion of the process of FIG. 5 is performed continually and/or periodically. For example, services operating on ports of a network node machine may dynamically change and changes are tracked by periodically scanning the ports of the network node.

Figure 6:
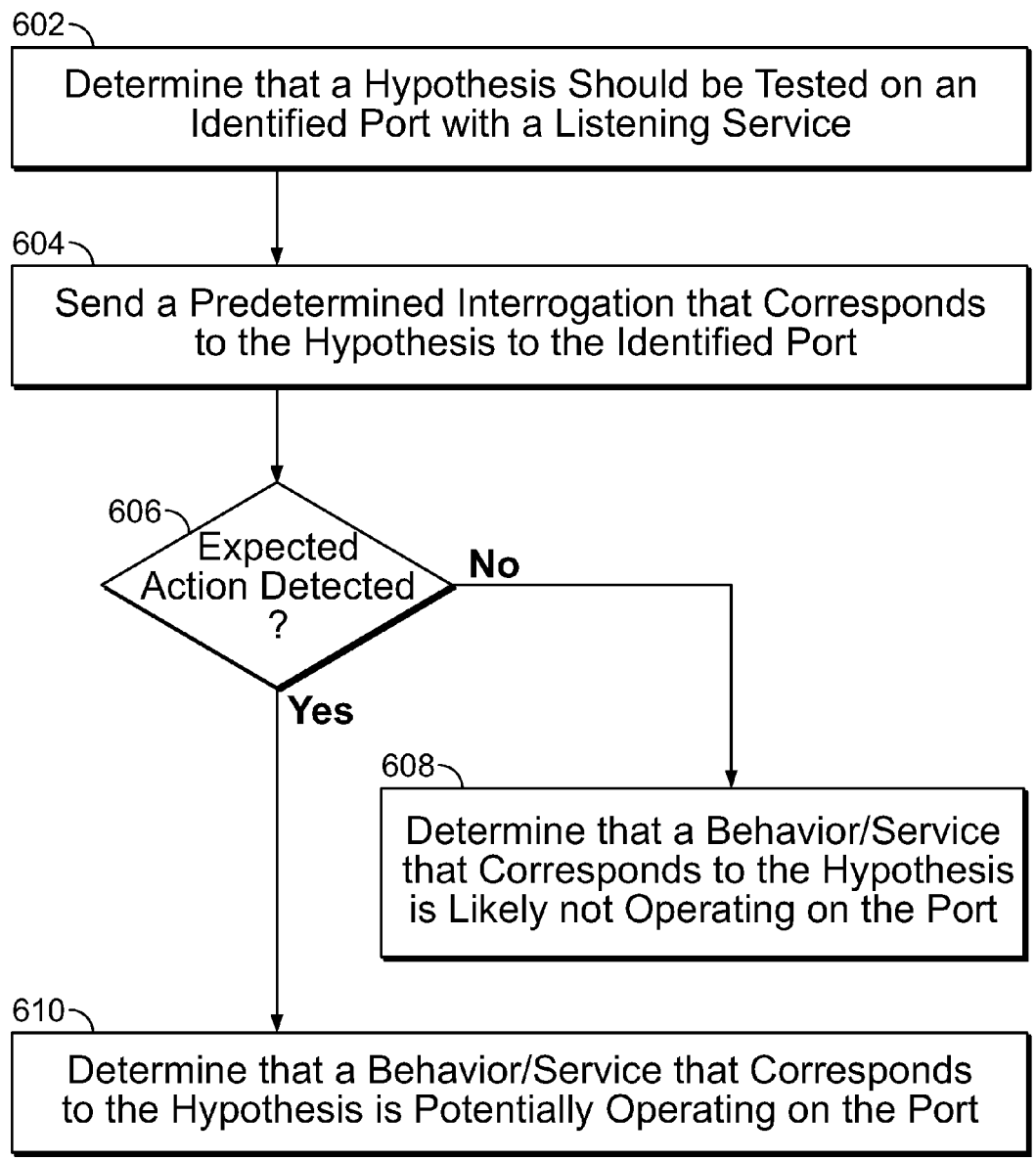
FIG. 6 is a flowchart illustrating an embodiment of a process for identifying a behavior of a service operating on one or more identified ports.

FIG. 6 is a flowchart illustrating an embodiment of a process for identifying a behavior of a service operating on one or more identified ports. The process of FIG. 6 may be at least in part implemented on interrogation node 102, remote server 120, modulator 104, and/or sniffer 110 of FIG. 1. In some embodiments, the process of FIG. 6 is included in 206 of FIG. 2. In some embodiments, the process of FIG. 6 includes analyzing one or more ports identified at 204 of FIG. 2 and/or identified using the process of FIG. 5. In some embodiments, the process of FIG. 6 is performed for each hypothesis for each port of each node being analyzed. For example, there exists a plurality of hypotheses to be tested and each hypothesis is tested, if applicable, on each port (e.g., ports determined using the process of FIG. 5) of each node (e.g., nodes determined using the process of FIG. 3 and/or FIG. 4).

At 602, it is determined that a hypothesis should be tested on an identified port with a listening service. In some embodiments, the identified port is a port identified at 204 of FIG. 2 and/or identified using the process of FIG. 5. In some embodiments, the hypothesis is associated with a specific behavior (e.g., proxy) and/or specific service (e.g., specific malware service) that could be operating on a port and desired to be tested to determine whether the specific behavior/service is operating on the port. For example, a hypothesis is associated with an HTTP service and testing the hypothesis includes determining whether the HTTP service is operating on the port being analyzed. A second hypothesis may be associated with a "Zeus" malware service and testing the second hypothesis includes determining whether the "Zeus" malware service is likely operating on the port being tested. In some embodiments, testing the hypothesis includes attempting to initiate communication with the identified port to determine whether a specific behavior/service identified by the hypothesis is operating on the identified port. For example, a packet is sent to the identified port to determine whether a communication library being utilized on the port responds in an expected manner indicative of the specific behavior/service of the hypothesis. In some embodiments, the identified port has been identified using the process of FIG. 5.

In some embodiments, determining that the hypothesis should be tested includes determining that the identified port is compatible with the hypothesis In some embodiments, determining that the hypothesis should be tested includes determining that the identified port utilizes a protocol that is compatible with the hypothesis. For example, a behavior/service associated with the hypothesis is only compatible with a certain protocol (e.g., UDP), and the hypothesis only should be tested if the identified port utilizes the protocol (e.g., must be a UDP port). In some embodiments, determining that the hypothesis should be tested includes determining that the identified port matches a port number that is compatible with the hypothesis. For example, a behavior/service associated with the hypothesis is only compatible with a certain port number (e.g., HTTP port 80), and the hypothesis only should be tested if the identified port is a compatible port number. In some embodiments, if is determined that the hypothesis should not be tested, the process ends.

In some embodiments, the hypothesis tests whether the port is operating an HTTP service. In some embodiments, the hypothesis tests whether the port is operating a Bonjour service. In some embodiments, the hypothesis tests whether the port is operating a BitTorrent service. In some embodiments, the hypothesis tests whether the port is operating a malware service. In some embodiments, the hypothesis tests whether the port is operating a "Zeus" malware service. In some embodiments, the hypothesis tests whether the port is operating a "Zeus" communication library. In some embodiments, the hypothesis tests whether the port is operating a "zero access" malware service. In some embodiments, the hypothesis tests whether the port is operating a "Padobot" malware service. In some embodiments, the hypothesis tests whether the port is operating a proxying service. In some embodiments, the hypothesis tests whether the port is operating a port knocking behavior. In some embodiments, the hypothesis tests whether the port is operating a dynamic reverse shell behavior. In some embodiments, the hypothesis tests whether the port is operating a port hopping behavior.

At 604, a predetermined interrogation that corresponds to the hypothesis is sent to the identified port. In some embodiments, one or more predetermined interrogation packets are sent to the identified port. In some embodiments, the predetermined interrogation packet invites a response that corresponds to the specific behavior and/or service being tested by the hypothesis. For example, the predetermined interrogation packet invites a response that identifies the communication library being utilized by the port, and the communication library being utilized is indicative of whether the specific behavior and/or service is operating on the port. In some embodiments, the hypothesis tests whether the port is operating an HTTP service by sending an HTTP request packet to the identified port. In some embodiments, to test whether the port is operating an HTTP service, the interrogation packet is an HTTP request packet. In some embodiments, to test whether the port is operating a malware service, the interrogation packet is a packet that elicits a communication from the malware service. In some embodiments, the interrogation packet includes a token/key/data that wakes/unlocks a behavior of a service operation on the identified port. For example, a malware operating on the port only becomes active when a "magic token" is provided and this token is provided.

In some embodiments, to detect whether a proxy service is being operated on the port, a packet that requests it to be forwarded to the sender of the packet is the predetermined interrogation packet. If the packet is bounded back to the sender, then it may be determined that a proxy service is operating on the port.

In some embodiments, sending the predetermined interrogation packet includes sending more than one packet. For example, a service operating on the identified port is utilizing port knocking and in order to invoke the service, a first packet (e.g., specific UDP packet) must be provided to the identified port that causes another listening service to become active on a different port (e.g., TCP port associated with identified UDP port). More than one packet may be sent to the same port number and/or different port numbers. In some embodiments, the hypothesis specifies which packets to send to which ports.

At 606 it is determined whether an expected action is detected. In some embodiments, the expected action is indicative of whether the port is operating the behavior/service being tested with the hypothesis. In some embodiments, the expected action is identified by the hypothesis. In some embodiments, detecting the expected action includes detecting whether a response responsive to the predetermined interrogation packet has been received. In some embodiments, determining whether the expected action is detected includes analyzing contents of a response provided in response to the interrogation packet to determine whether it includes an expected content.

If at 606 it is determined that the expected action is not detected, at 608 it is determined that a behavior/service that corresponds to the hypothesis is likely not operating on the port.

If at 606 it is determined that the expected action is detected, at 610 it is determined that a behavior/service that corresponds to the hypothesis is potentially operating on the port. In some embodiments, a confidence indicator indicating a level/degree of confidence that the behavior/service determined to be potentially operating on the port is determined. In some embodiments, this determination is recorded in a data structure identifying a service/behavior operating on ports (e.g., ports identified using the process of FIG. 5) of a node (e.g., nodes identified using the processes of FIGS. 3 and/or 4). In some embodiments, even though it is determined that the behavior/service that corresponds to the hypothesis is potentially operating on the port, other hypotheses may be tested on the port to determine whether additional and/or other behavior/service is being operated on the identified port. For example, a "padobot" malware operating on a port may be identified as both an HTTP service and a "padobot" service because the "padobot" service utilizes the communication library of a typical HTTP service. The "padobot" service may be identified as the single service operating on the port because the identification of the "padobot" service is higher ranked (e.g., higher ranked in a predetermined hierarchy) and determined with a higher determined confidence identifier than the identification of the HTTP service.

Figure 7:
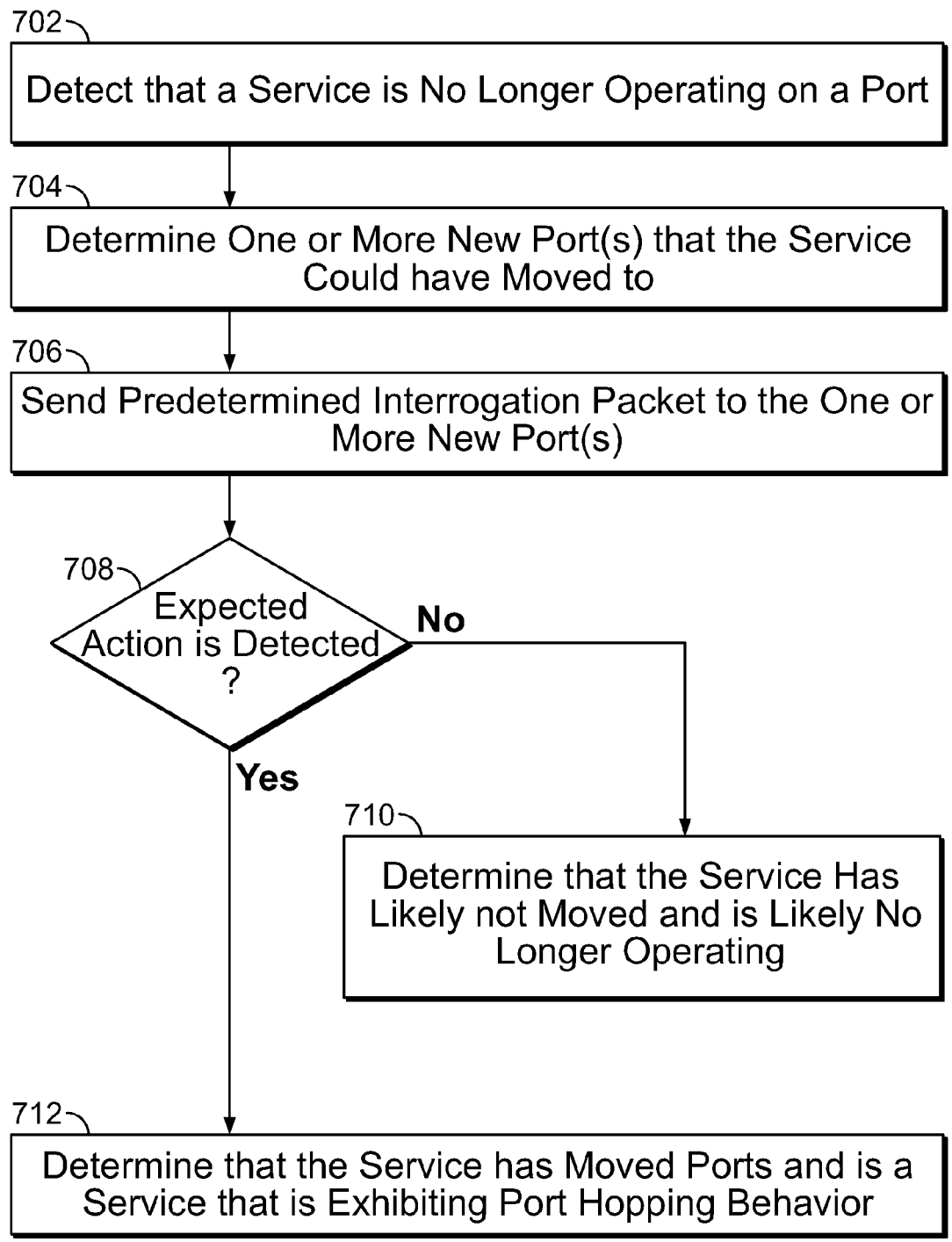
FIG. 7 is a flowchart illustrating an embodiment of a process for determining whether port hopping is being utilized on a port.

FIG. 7 is a flowchart illustrating an embodiment of a process for determining whether port hopping is being utilized on a port. The process of FIG. 7 may be at least in part implemented on interrogation node 102, remote server 120, modulator 104, and/or sniffer 110 of FIG. 1. In some embodiments, the process of FIG. 7 is included in 206 of FIG. 2. In some embodiments, the process of FIG. 7 includes analyzing one or more ports identified at 204 of FIG. 2 and/or identified using the process of FIG. 5. In some embodiments, port hopping refers to a behavior of a service that changes its operating communication port to avoid detection.

At 702, it is detected that a service is no longer operating on a port. In some embodiments, the service was detected that it was operating on the port using the process of FIG. 5 and/or FIG. 6. For example, the process of FIG. 5 and/or 6 is periodically repeated to discover changes to services operating on ports of a node. The port may no longer have an operating listening service or the port may be operating a different service as compared to a previously determined service of the port.

At 704, one or more new ports that the service could have moved to are determined. In some embodiments, the new port is a next sequential port number (e.g., incremental or decremental) from the previous port number. In some embodiments, the new port number could be a pseudo random port number. A hypothesis is made as to which random generator seed (e.g., seed utilized by a known port hopping service) and random generator function (e.g., standard system random generator function) may have been utilized, and the determined seed and function are utilized to determine the new port number. In some embodiments, more than one potential new port number may be determined.

At 706, a predetermined interrogation packet is sent to the one or more new port(s). In some embodiments, the predetermined interrogation packet invites a response that corresponds to whether the service has moved ports. For example, the same interrogation packet that was used to previously identify the service is set to the new port(s).

At 708, it is determined whether an expected action is detected. In some embodiments, the expected action is indicative of whether the new port is operating the service that is no longer operating on the old port. In some embodiments, detecting the expected action includes detecting whether a response responsive to the predetermined interrogation packet has been received. In some embodiments, determining whether the expected action is detected includes analyzing contents of a response provided in response to the interrogation packet to determine whether it includes an expected content.

If at 708 it is determined that the expected action is not detected, at 710 it is determined that the service has likely not moved and is likely no longer operating.

If at 708 it is determined that the expected action is detected, at 712 it is determined that the service has moved ports and is a service that is exhibiting port hopping behavior. In some embodiments, this determination is recorded/updated in a data structure identifying a service/behavior operating on ports (e.g., ports identified using the process of FIG. 5) of a node (e.g., nodes identified using the processes of FIGS. 3 and/or 4).

Figure 8:
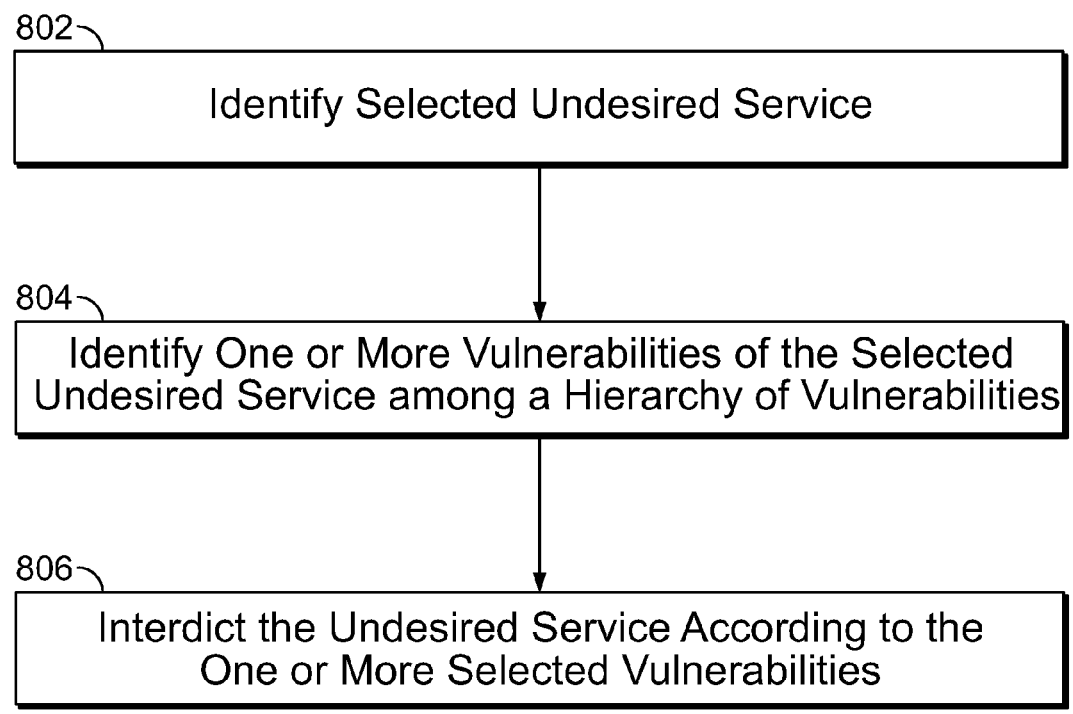
FIG. 8 is a flowchart illustrating an embodiment of a process for attempting to interdict an undesired service.

FIG. 8 is a flowchart illustrating an embodiment of a process for attempting to interdict an undesired service. In some embodiments, the process of FIG. 8 is implemented on interrogation node 102 and/or interdiction module 130 of FIG. 1.

At 802, a selected undesired service is identified. In some embodiments, the selected undesired service is identified among services identified at 206 of FIG. 2 and/or 610 of FIG. 6. For example, a list of services operating on ports of one or more network nodes is determined and one or more of the determined services are selected as undesired. In some embodiments, the selected undesired service has been selected by a user such as a network administrator. In some embodiments, the selected undesired service has been selected automatically. For example, if it is determined at 206 of FIG. 2 and/or 610 of FIG. 6 that a service is associated with an undesired behavior and/or service type (e.g., likely malware service), the service is automatically selected as undesired. One or more of the hypothesis used in FIG. 6 may be associated with an undesired service and if it is determined that a detected service corresponds to the hypothesis associated with the undesired service, the detected service is selected as undesired. In some embodiments, the selected undesired service is one of a group of undesired services and each undesired service of the group is successively selected in successive iterations of the process of FIG. 8.

At 804, one or more vulnerabilities of the selected undesired service are identified among a hierarchy of vulnerabilities. For example, there exists a hierarchy of actions (e.g., each exploiting a vulnerability) that may be performed in order to interdict the undesired service. An order of the hierarchy may be associated with desirability and/or efficiency of the action. For example, it may be preferable to stop the undesired service rather than stop an entire node/computer hosting the service and stopping the service is ranked higher in the hierarchy than stopping the node. Not all actions to interdict the undesired service may be effective and/or possible to interdict the undesired service, and the vulnerabilities of the undesired service that allow one or more actions to be utilized are identified. In some embodiments, the hierarchy of vulnerabilities is predetermined, and each vulnerability in the hierarchy is analyzed in a predetermined order. In some embodiments, selecting the vulnerability includes determining that an action associated with the vulnerability should be performed in an attempt to interdict the undesired service.

At 806, the undesired service is interdicted according to the one or more selected vulnerabilities. For example, each corresponding action of a selected vulnerability from a group of selected vulnerabilities is performed in the order of the hierarchy until the undesired service is interdicted. In some embodiments, interdicting the service includes stopping the service. In some embodiments, interdicting the service includes disabling at least a portion of the service. In some embodiments, interdicting the service includes reducing at least a portion of the service. In some embodiments, interdicting the service includes disabling/denying network connection of a host node of the service.

Figure 9:
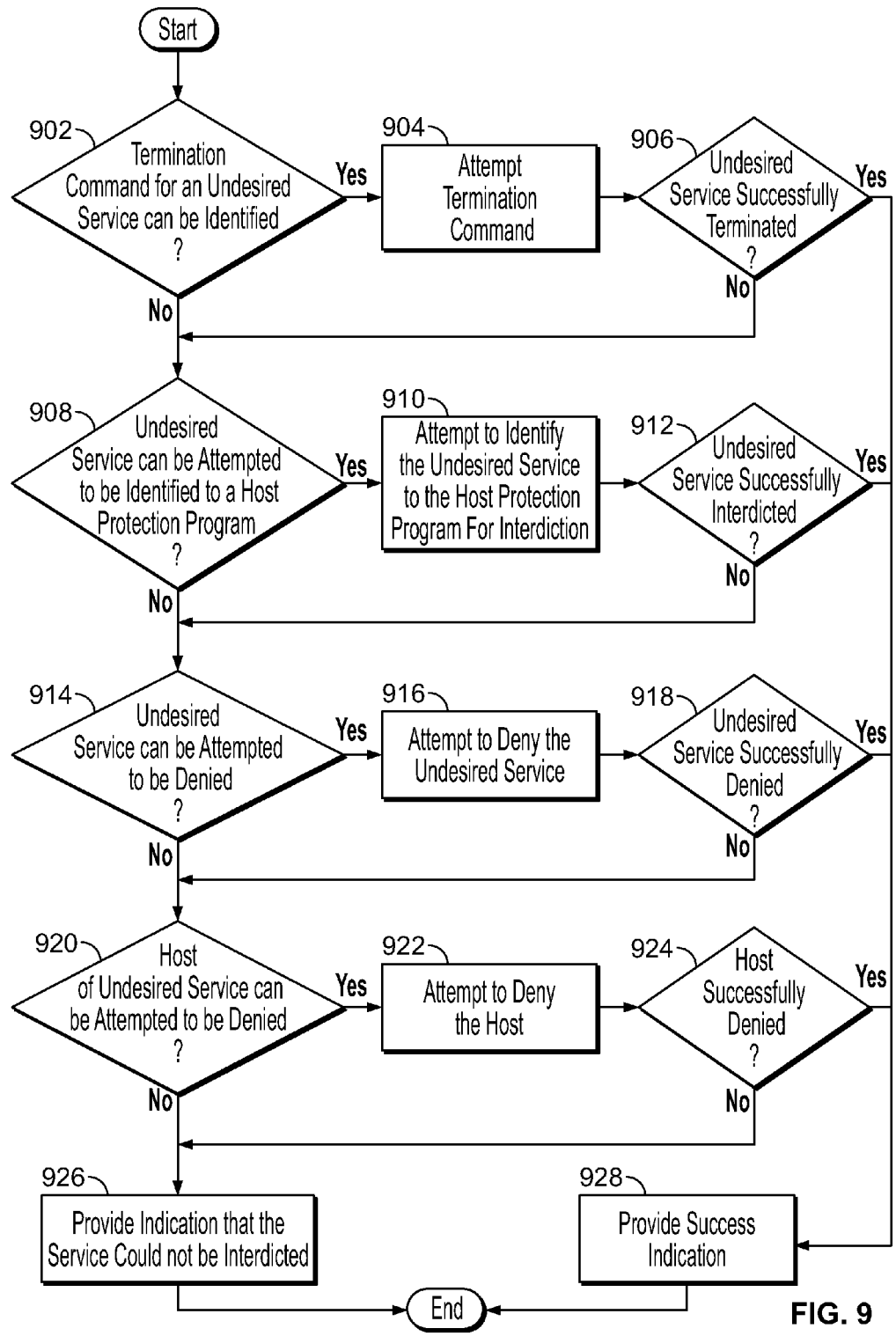
FIG. 9 is a flowchart illustrating an embodiment of a process for interdicting a selected undesired service.

FIG. 9 is a flowchart illustrating an embodiment of a process for interdicting a selected undesired service. In some embodiments, the process of FIG. 9 is implemented on interrogation node 102 and/or interdiction model 130 of FIG. 1. In some embodiments, at least a portion of the process of FIG. 9 is included 804 and/or 806 of FIG. 8. For example, the process of FIG. 9 is utilized to interdict a selected undesired service using a hierarchy of vulnerabilities and corresponding actions.

At 902, it is determined whether a termination command for an undesired service can be identified. In some embodiments, the undesired service is a selected undesired service selected at 802 of FIG. 8. In some embodiments, an undesired service may be terminated remotely by sending a communication to the service. For example, a certain malware service may be terminated by sending a "KILL" command to the malware via a communication channel/port of the malware service. In some embodiments, identifying a termination command includes identifying a vulnerability of the undesired service to a termination command. In some embodiments, identifying the termination command includes determining a type and/or identification of the undesired service. For example, a type identification of the service and/or a behavior of the service identified at 610 of FIG. 6 is used to determine whether the undesired service will likely respond to a termination command (e.g., there exists a list associating service identifications with corresponding termination commands and it is determined whether the undesired service to be interdicted is associated with any corresponding termination command). In some embodiments, identifying a termination command includes determining whether a hypothesis determined to be associated with the undesired service (e.g., determined at 610 of FIG. 6) indicates that the service is associated with a termination command.

If at 902 it is determined that the termination command for the undesired service is identified, at 904, the termination command is attempted. In some embodiments, attempting the command includes sending the termination command according to the vulnerability identified at 902. In some embodiments, attempting the command includes sending the identified termination command to the service. For example, the identified termination command packet is sent to a communication port of a host that is hosting the undesired service. In some embodiments, attempting the termination command includes spoofing an external communication party controlling the service (e.g., communicate the termination command as if it was provided by an external communication party remotely controlling the service). In some embodiments, when the termination command is received by the undesired service, the undesired service propagates the termination command to other instances of the service in other peer hosts. In some embodiments, the termination command is provided to the undesired service as if it was provided a peer service operating on a peer host that is attempting to propagate the termination command to other peers.

At 906, it is determined whether the undesired service has been successfully terminated. In some embodiments, determining whether the service has been successfully terminated includes querying a communication of the port utilized by the service to determine whether the service is responsive to the query. For example, step 204 and/or 206 of FIG. 2 is performed. In some embodiments, determining whether the service has been successfully terminated includes attempting to communicate with the service. For example, if a communication cannot be established with service, it is determined that the service has been terminated. In some embodiments, determining whether the service has been successfully terminated includes analyzing data (e.g., a report of operating services) provided by a host hosting the service. For example, the data may indicate that the service has been terminated. In some embodiments, if it is determined that the service has not been successfully terminated, a different termination command is attempted, if applicable. If the undesired service has been successfully terminated, it is determined that the service has been successfully interdicted.

If at 902 it is determined that a termination command cannot be identified or at 906 it is determined that the service has not been successfully terminated, at 908 it is determined whether service can attempt to be identified to a host protection program. For example, it is determined whether the service can attempted to be identified to an antivirus program operating on a host system of the service to allow the antivirus program to terminate or quarantine the undesired service. Examples of the host protection program include an antivirus program, a malware protection program, an intrusion protection system/program, intrusion detection system/program, and any other program capable of affecting an operation of the service. In some embodiments, determining whether the service can attempt to be identified to a host protection program includes determining whether enough information about a host of the service is known to identify the service to the host protection program of the service host. For example, it is determined whether a known host protection program is operating on the host of the undesired service and/or the host protection program operating on the host is capable of detecting/receiving the identification to interdict the undesired service. In some embodiments, identifying whether the service can attempt to be identified to the host protection program includes identifying whether the undesired service is vulnerable to the host protection program.

If at 908 it is determined that the service can attempt to be identified to the host protection program, at 910, the undesired service is attempted to be identified to the host protection program for interdiction. For example, the host protection program may not realize that the service is an undesired service, and the undesired service is associated with an identifiable code likely known to be undesirable by the host protection program. In some embodiments, identifying the undesired service includes providing a communication that includes data associated with a likely identifiable undesired code (e.g., associated with a virus/malware likely to be recognized by the host protection program) to the undesired service. When the service receives the communication, the service likely places the communication in memory to process the received communication, and the host protection program that is monitoring the memory of the host likely will recognize contents of the communication as undesired and attempt to terminate/quarantine the undesired service.

At 912, it is determined whether the undesired service has been successfully interdicted. In some embodiments, determining whether the service has been successfully interdicted includes querying a communication of the port of the service to determine responsiveness of the service to the query. For example, step 204 and/or 206 of FIG. 2 is performed. In some embodiments, determining whether the service has been successfully interdicted includes attempting to communicate with the service. For example, if a communication can be established with the service, it is determined that the service has not been successfully interdicted. In some embodiments, determining whether the service has been successfully interdicted includes determining a communication rate of the service. For example, if the communication rate of the service is below a threshold, it is determined that the service has been interdicted. In some embodiments, determining whether the service has been successfully interdicted includes analyzing data (e.g., a report of operating services) provided by a host system hosting the service. For example, the data indicates whether the service has been terminated and interdicted. In some embodiments if it is determined that the service has not been successfully interdicted, a different method of identifying the service to the host protection program is attempted, if applicable. In some embodiments, if it is determined that the undesired service has been terminated and/or quarantined, it is determined that the undesired service has been interdicted.

If at 908 it is determined that the service cannot attempt to be identified to a host protection program or at 912 it is determined that the service has not been successfully interdicted, at 914 it is determined whether the undesired service can be attempted to be denied. An example of denying the service includes continually preventing the service from establishing a communication connection. In some embodiments, determining whether the service can be attempted to be denied includes determining whether enough information is known to attempt to deny the service. For example, it is determined whether enough information is known about a connection, router(s), host, operating system, etc. associated with the service in order to attempt one or more actions that can be performed in an attempt to deny the service. In some embodiments, identifying whether the service can be attempted to be terminated includes identifying a vulnerability of the service to one or more actions that attempt to deny the service. In some embodiments, denying the undesired service includes denying the service without denying an entire host system of the service. For example, other desired services of the host are fully operational while the undesired service is denied full operation. In some embodiments, deterring whether the undesired service can be attempted to be denied includes determining whether the undesired service is vulnerable to be being denied using one or more actions.

If at 914 it is determined that the undesired service can be attempted to be denied, at 916, the undesired service is attempted to be denied. In some embodiments, attempting to deny the service includes resetting one or more communication connections of the service, slowing down a communication rate of the service, and/or establishing/occupying one or more connections with the service. In some embodiments, attempting to deny the service includes isolating the service from network communication. In some embodiments, denying the service includes performing a denial of service attack on the service. In some embodiments, action utilized in an attempt to deny the service was determined based on available information determined at 914. For example, there exists a plurality of actions that may be utilized to deny the service and which action to attempt is determined based on whether sufficient information is known to be able to perform the action. In some embodiments, there exists a plurality of actions that can be performed in an attempt to deny the service, and each action is successively performed in a hierarchy order until the actions are exhausted or one of the actions is successful in denying the service.

At 918, it is determined whether the undesired service has been successfully denied. In some embodiments, determining whether the service has been successfully denied includes determining responsiveness of the service. For example, if the service is not responsive, it is determined that the service has been successfully denied. In some embodiments, determining whether the service has been successfully denied includes attempting to communicate with the service. For example, a new communication is attempted to be established with the service and/or responsiveness of the service is measured. If the new communication cannot be established, it may be determined that the service has been successfully denied. In some embodiments, determining whether the service has been successfully denied includes determining a communication rate of the service. For example, if the communication rate is below a threshold, it is determined that the service has been denied. In some embodiments, determining whether the service has been successfully denied includes analyzing data (e.g., a report of operating services) provided by a host hosting the service. For example, the data indicates whether the service has been denied. In some embodiments, if it is determined that the service has not been successfully denied, a different action attempting to deny the service is attempted, if applicable, in a determined hierarchy order. In some embodiments, if it is determined that the undesired service has been successfully denied, it is determined that the undesired service has been interdicted.

If at 914 it is determined that the service cannot be attempted to be denied or at 918 it is determined that the service has not been successfully denied, at 920 it is determined whether the host of the service can be attempted to be denied. An example of denying the host includes continually preventing the host system hosting the service from establishing any network communication channels. In some embodiments, determining whether the host can be attempted to be denied includes determining whether enough information is known to attempt to deny the host. For example, it is determined whether enough information is known about a connection, router(s), host, operating system, etc. associated with the service in order to attempt one or more actions that can be performed in an attempt to deny the host. In some embodiments, identifying whether the host can be attempted to be denied includes identifying a vulnerability of the service to one or more actions that attempt to deny the host of the service. In some embodiments, denying the host includes denying the service as well as other communication services of the host. For example, all services of the host are attempted to be denied access to a network.

If at 920 it is determined that the host of the service can be attempted to be denied, at 922, the host is attempted to be denied. In some embodiments, attempting to deny the host includes expiring an IP address of the host, hindering a communication with a router, and/or denying the host access to a network. In some embodiments, attempting to deny the host includes isolating the host from network communication. In some embodiments, denying the host includes performing a denial of service attack on the host. In some embodiments, action utilized in an attempt to deny the host was determined based on available information determined at 920. For example, there exists a plurality of actions that may be utilized to deny the host and which action is used is determined based on whether sufficient information is known to be able to perform the action. In some embodiments, there exists a plurality of actions to perform in an attempt to deny the host, and each action is successively performed in a hierarchy order until the actions are exhausted or one of the actions is successful in denying the host.

At 924, it is determined whether the host has been successfully denied. In some embodiments, determining whether the host has been successfully denied includes determining responsiveness of the host. For example, if the host is not responsive, it is determined that the service has been successfully denied. In some embodiments, determining whether the host has been successfully denied includes attempting to communicate with the service and/or host. For example, a new communication is attempted to be established with the host and/or responsiveness of the service is measured. If the new communication cannot be established, it may be determined that the service has been successfully denied. In some embodiments, determining whether the host has been successfully denied includes determining a communication rate of the host. For example, if the communication rate is below a threshold, it is determined that the host has been denied. In some embodiments, determining whether the host has been successfully denied includes analyzing data (e.g., a report of operating services) provided by the host. For example, the data indicates whether the host has been denied. In some embodiments, if it is determined that the host has not been successfully denied, a different action attempting to deny the host is attempted, if applicable, in a determined hierarchy order. In some embodiments, if it is determined that the host has been successfully denied, it is determined that the service has been successfully interdicted.

If at 920 it is determined that the host cannot be attempted to be denied or at 924 it is determined that the host has not been successfully denied, at 926, an indication is provided that the service could not be interdicted. For example, an error message is provided to a network administrator to enable further follow up.

If at 906, 912, 918, or 924 it is determined that the service has been successfully interdicted, at 928, a success indication is provided. In some embodiments, the provided indication identifies how the service was interdicted (e.g., terminated, indicted by a host program, service denied, host denied, etc.).

The process of FIG. 9 shows an example hierarchy of vulnerabilities of the service and corresponding actions to be performed in an attempt to interdict the service. For example, first the service is attempted to be terminated, second the service is attempted to be identified to a host protection program for interdiction, third the service is attempted to be denied, and when all else fails, the entire host hosting the service is attempted to be denied. The example shown in FIG. 9 is only one example of a hierarchy order. In other embodiments the ordering/hierarchy of the elements of FIG. 9 may be different and/or other elements may exist.

Figure 10:
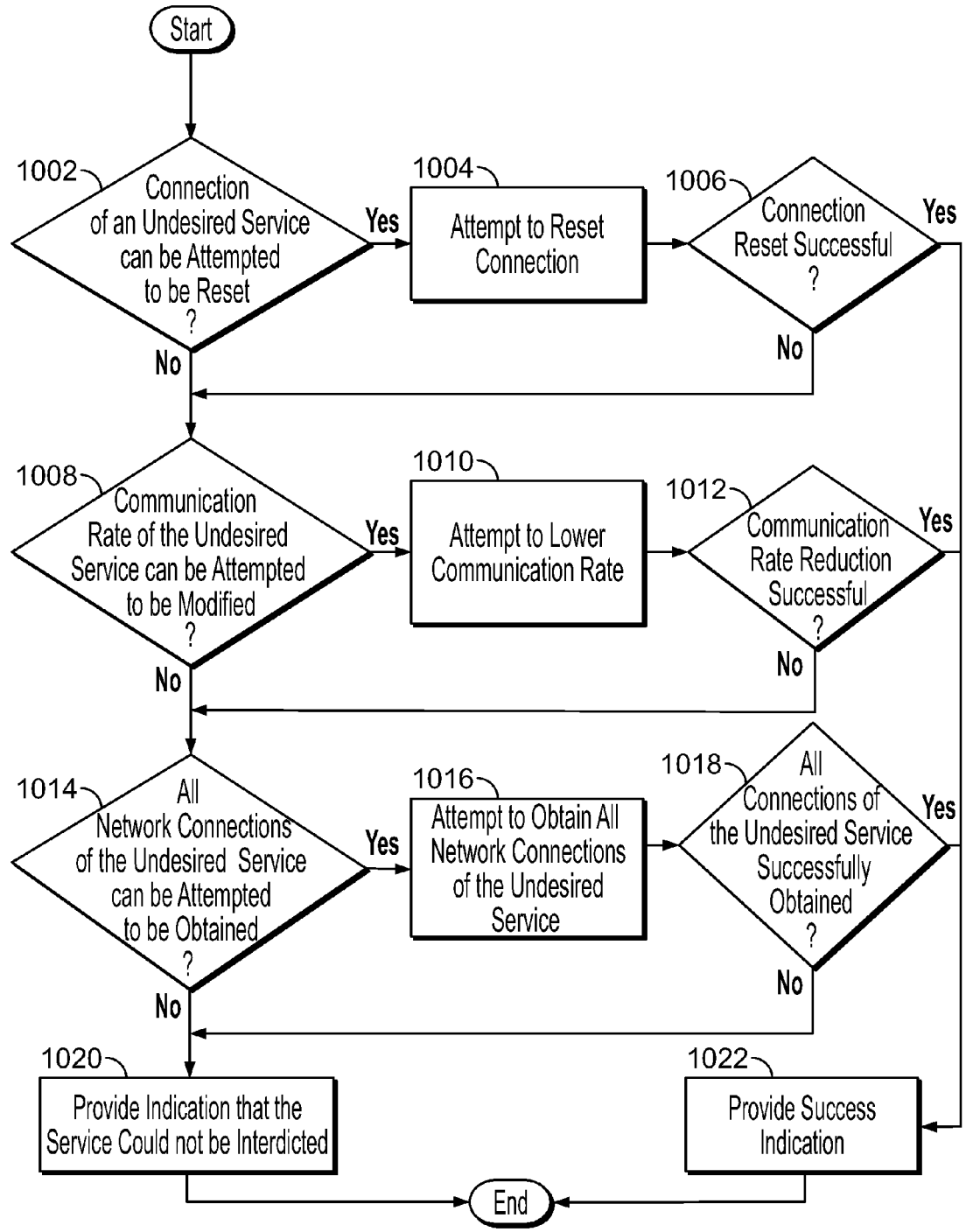
FIG. 10 is a flowchart illustrating an embodiment of a process for attempting to deny a service.

FIG. 10 is a flowchart illustrating an embodiment of a process for attempting to deny a service. In some embodiments, the process of FIG. 10 is implemented on interrogation node 102 and/or interdiction model 130 of FIG. 1. In some embodiments, at least a portion of the process of FIG. 10 is included in 804 and/or 806 of FIG. 8 and/or 914, 916 and/or 918 of FIG. 9.

At 1002, it is determined whether a connection of an undesired service can be attempted to be reset. In some embodiments, the undesired service is a selected undesired serviced selected at 802 of FIG. 8. In some embodiments, the undesired service is the service attempted to be interdicted using the process of FIG. 9. In some embodiments, determining whether the connection can be attempted to be reset includes determining whether there exists information and/or authorization to reset the connection of the service. For example, it is determined whether the connection can be reset via a router handing the network communication connection of the service. In some embodiments, the connection is one of a plurality (e.g., all) of connections of the service attempted to be reset. In some embodiments, determining whether connection of the undesired service can be attempted to be reset includes determining whether the undesired service is vulnerable to having its network connect reset.

If at 1002 it is determined that the connection can be attempted to be reset, at 1004, the connection is attempted to be reset. In some embodiments, attempting to reset the connection includes using a router connected to a host of the service to reset the connection. For example, an indication is provided to the router to disconnect the network connection. In some embodiments, resetting the connection includes disconnecting the connection. In some embodiments, resetting the connection includes attempting to disconnect all network connections of the service. In some embodiments, attempting to reset the connection includes sending a reset connection message to the service. For example, a router in communication with the service is spoofed and a reset connection message is sent to the service as if the message originated from the router. In some embodiments, attempting the reset of the connection includes periodically attempting to reset the connection. For example, the service attempts to reestablish the connection after the connection has been reset and the connection is reset on a periodic basis to effectively disable the service from reestablishing a network connection.

At 1006, it is determined whether the connection reset is successful. In some embodiments, determining whether the connection has been successfully reset includes determining responsiveness of the service. For example, if the service is not responsive, it is determined that the connection has been successfully reset. In some embodiments, determining whether the connection has been reset includes attempting to communicate using the connection. For example, a communication is attempted using the connection. If the communication is not successful, it may be determined that the connection has been reset. In some embodiments, determining whether the connection has been successfully reset includes analyzing data (e.g., connection status) provided by a host hosting the service and/or a router in communication with the service. For example, the data indicates whether the connection has been reset and disconnected. In some embodiments if it is determined that the connection has not been successfully reset, a different action attempting to reset the connection is attempted, if applicable, in a determined hierarchy order. In some embodiments, if it is determined that the connection has been reset, it is determined that the service has been successfully interdicted.

If at 1002 it is determined that the connection cannot be attempted to be reset or at 1006, it is determined that the connection reset was not successful, at 1008, it is determined whether a communication rate of the undesired service can be attempted to be modified. In some embodiments, determining whether the communication rate can be attempted to be modified includes determining whether there exists information and/or authorization to modify the communication rate of the service. For example, it is determined whether a communication rate of one or more network connections of the service can be modified via a router handling the connection of the service. In some embodiments, determining whether the communication rate can be modified includes determining whether a window size of one or more connections of the service can be modified (e.g., window size reduced to slow down communication rate). If the window size can be modified, the communication rate may be able to be modified. In some embodiments, determining whether the communication rate can be attempted to be modified includes determining whether a router handling a connection of the service can be spoofed. If the router can be spoofed, the communication rate may be able to be modified. In some embodiments, determining whether the communication rate of the service can be attempted to be modified includes determining whether the communication rate can be modified to a desired rate. For example, it is determined whether the communication rate can be reduced below a threshold rate. If the communication rate can be reduced below a threshold rate, the communication rate may be able to be modified. In some embodiments, determining whether the communication rate of the service can be attempted to be modified includes determining whether the undesired service is vulnerable to having its network communication rate modified.

If at 1008 it is determined that the communication rate can be attempted to be modified, at 1010 the communication rate is attempted to be lowered. In some embodiments, attempting to lower the communication rate includes using a router connected to a host of the service to lower a communication rate of a network connection of the service. For example, a packet window size is set as one byte to drastically slow down the communication rate to effectively disable the network connection of the service. In some embodiments, the communication rate is lowered for a plurality (e.g., all) of connections of the service. In some embodiments, attempting to reduce the communication rate includes sending a packet window size change message to the service. For example, a router in communication with the service is spoofed and the packet window size change message/packet is sent to the service as if the message/packet originated from the router. In some embodiments, lowering the communication rate includes reducing the communication rate to the lowest possible setting (e.g., packet window size of one byte) to effectively disable network communications to/from the service.

At 1012, it is determined whether the communication rate reduction is successful. In some embodiments, determining whether the communication rate has been successfully reduced includes determining responsiveness of the service. For example, if the service is not responsive within a threshold amount of time, it is determined that the communication rate reduction was successful. In some embodiments, determining whether the communication rate has been successfully reduced includes attempting to communicate using the connection of the service. For example, a communication is attempted using the connection. If the communication is successful, it may be determined that the communication rate reduction was not successful. In some embodiments, determining whether the communication rate has been successfully reduced includes analyzing data (e.g., connection status) provided by a host hosting the service and/or a router in communication with the service. For example, the data may indicate whether the communication rate has been reduced to a desired rate. In some embodiments, determining whether the communication rate has been successfully reduced includes measuring/determining the communication rate. For example, it is determined whether the communication rate is below a threshold rate. In some embodiments, if it is determined that the communication rate has not been successfully reduced, a different action attempting to reduce the communication rate is attempted, if applicable, in a determined hierarchy order. In some embodiments, if the communication reduction was successful, it is determined that the service has been successfully interdicted.

If at 1008 it is determined that the communication rate cannot be attempted to be modified or at 1012, it is determined that the communication rate was not successfully reduced, at 1014, it is determined whether all network connections of the undesired service can be attempted to be obtained. In some embodiments, determining whether all connections can be attempted to be obtained includes determining whether there exists information and/or authorization to establish/occupy one or more connections with the service. In some embodiments, determining whether the connections can be attempted to be obtained includes determining the maximum of network connections that can be simultaneous maintained by the service. For example, there may exist a maximum number of simultaneous network connections that can be maintained, and by establishing and occupying all available connections of the service, the service is effectively unable to establish a network connection to any other communication party. In some embodiments, determining whether all network connections of the service can be obtained includes determining whether the service is vulnerable to having all of its available network connections occupied in an attempt to disable network communications of the service.

If at 1014 it is determined that all connections to the service can be attempted to be obtained, at 1016 all network connections to the service are attempted to be obtained. In some embodiments, attempting to establish all connections includes attempting to occupy all simultaneous connections allowed by an operating system of the service to effectively not allow the service to establish communication with any other party. In some embodiments, attempting to establish all connections includes continually attempting to establish a new connection with the service at a periodic interval. For example, a connection is continually attempted to be established to obtain any new or dropped connections of the service. In some embodiments, attempting to establish all connections includes attempting to maintain one more than a known maximum number of connections of the service. In some embodiments, attempting to establish all connections includes attempting to reset/disconnect already established connections of the service prior to attempting to establish and occupy all network connections of the service.

At 1018, it is determined whether all connections of the undesired service have been obtained. In some embodiments, determining whether all connections have been obtained includes determining whether the number of established connections with the service matches a known maximum number of connections allowed by an operating system and/or communication library of the service. In some embodiments, determining whether all connections have been obtained includes attempting to establish a new connection with the service. For example, if a new connection can be obtained, it is determined that not all available connections of the service have been obtained and/or the maximum number of simultaneous network connections allowed by the service may be different that a predetermined number. In some embodiments, determining whether all connections have been obtained includes analyzing data (e.g., connection status) provided by a host hosting the service and/or a router in communication with the service. For example, the data indicates which network connections of the service have been obtained. In some embodiments, if it is determined that not all connections have been obtained, a different action attempting to establish a connection is attempted, if applicable, in a determined hierarchy order. In some embodiments, if it is determined that all connections of the service have been obtained, it is determined that the service has been successfully interdicted.

If at 1014, it is determined not all connections of the service can be attempted to be obtained or at 1018 it is determined that not all connections have been obtained, at 1020, an indication is provided that the service could not be denied. For example, an error message is provided and in the process of FIG. 9, the process proceeds from 918 to 920.

If at 1006, 1012 or 1018 it is determined that the service has been successfully denied, at 1022, a success indication is provided. In some embodiments, the provided indication identifies how the service was denied. In some embodiments, in the process of FIG. 9, the process proceeds from 918 to 926.

The process of FIG. 10 shows an example hierarchy of vulnerabilities of the service and corresponding hierarchy of actions to be performed in an attempt to deny the service. For example, first connections of the service are attempted to be reset, second the communication rate of the service is attempted to be reduced and third all connection of the service is attempted to be occupied. The example shown in FIG. 10 is only one example of a hierarchy order. In other embodiments the ordering/hierarchy of the elements of FIG. 10 may be different and/or other elements may exist.

Figure 11:
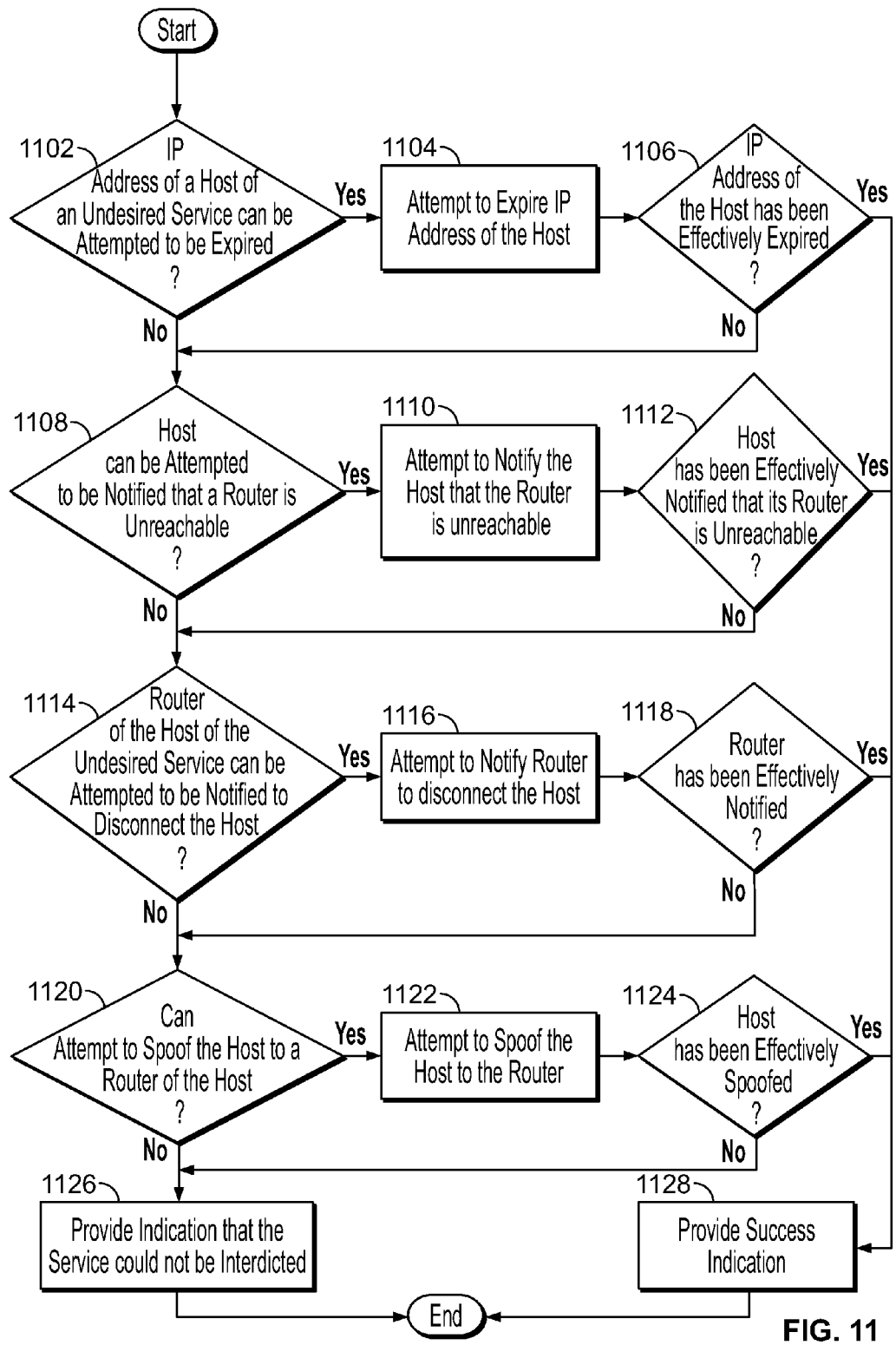
FIG. 11 is a flowchart illustrating an embodiment of a process for attempting to deny a host of a service.

FIG. 11 is a flowchart illustrating an embodiment of a process for attempting to deny a host of a service. In some embodiments, the process of FIG. 11 is implemented on interrogation node 102 and/or interdiction model 130 of FIG. 1. In some embodiments, at least a portion of the process of FIG. 11 is included in 804 and/or 806 of FIG. 8 and/or 920, 922 and/or 924 of FIG. 9.

At 1102, it is determined whether an Internet Protocol (i.e., IP) address of a host of an undesired service can be attempted to be expired. In some embodiments, the service is a selected undesired serviced selected at 802 of FIG. 8. In some embodiments, the service is the service attempted to be interdicted using the process of FIG. 9. In some embodiments, determining whether the IP address can be attempted to be expired includes determining whether enough information is known to expire the IP address. For example, it is determined whether enough information is known about a connection, router(s), host, operating system, etc. associated with the service in order to attempt to expire the IP address. In some embodiments, it is determined whether a Dynamic Host Configuration Protocol (i.e., DHCP) server can be spoofed to send a message to the host that its IP address has expired. In some embodiments, determining whether the IP address can be attempted to be expired includes determining whether the service and/or host of the service is vulnerable to having its IP address expired.

If at 1102 it is determined that the IP address of the host can be attempted to be expired, at 1104, the IP address of the host is attempted to be expired. In some embodiments, attempting to expire the IP address includes sending a spoofed DHCP message to the host that its IP address has expired. The spoofed DHCP message may appear to the host as a message originated by a DHCP server, a router, and/or any other network component. The spoofed DHCP message may cause the host to stop all network communications of the host and request a new IP address. In some embodiments, a spoofed DHCP message is periodically sent to the host that its IP address has expired. This may cause the host to continually request a new IP address and effectively disable network communications of the host.

At 1106, it is determined whether the IP address of the host has been effectively expired. In some embodiments, determining whether the IP address of the host has been expired includes attempting to communicate with the host. For example, if a communication (e.g., a new connection) with the host cannot be established using the last known IP address of the host, it is determined that the IP address of the host has been successfully expired. In some embodiments, determining whether the IP address of the host has been expired includes analyzing IP address data of a DHCP server. For example, a current IP address of the host is verified using the DHCP server. In some embodiments, determining whether the IP address of the host has been expired includes analyzing data (e.g., IP address) provided by the host and/or a router in communication with the host. For example, the data indicates the current IP address, if any, of the host. In some embodiments, if it is determined that the IP address has not been effectively expired, a different action attempting to expire the IP address is attempted, if applicable, in a determined hierarchy order. In some embodiments, if it is determined that the IP address has been expired, it is determined that the undesired service has been successfully interdicted.

If at 1102 it is determined that the IP address of the host cannot be attempted to be expired or at 1106 it is determined that the IP address of the host has not been effectively expired, at 1108 it is determined whether the host can be attempted to be notified that a router is unreachable. In some embodiments, determining whether the host can be attempted to be notified includes determining whether enough information is known to notify the host about its router. For example, it is determined whether enough information is known about a connection, router(s), host, and/or operating system associated with the service in order to attempt to notify the host that a router used by the host is unreachable. In some embodiments, it is determined whether a router and/or hub in communication with the host can be spoofed. If the router/hub can be spoofed, it may be determined that the notification that the router is unreachable can be attempted. For example, it is determined whether Address Resolution Protocol (i.e., ARP) spoofing can be attempted.

If at 1108 it is determined that the host can be attempted to be notified that the router is unreachable, at 1110, the host is attempted to be notified that the router is unreachable. In some embodiments, attempting to notify the host includes ARP spoofing and providing a message to the host that its router is unreachable. This may cause the host to stop all network communications and attempt to find another router. In some embodiments, a spoofed ARP message is periodically set to the host. This may cause the host to continually seek a new router and effectively disable network communications of the host.

At 1112, it is determined whether host has been effectively notified that its router is unreachable. In some embodiments, determining whether the host has been effectively notified includes attempting to communicate with the host. For example, if a communication (e.g., a new connection) with the host cannot be established, it is determined that the host has been effectively notified that its router is unreachable. In some embodiments, determining whether the host has been effectively notified includes analyzing data (e.g., router connection information) provided by the host and/or a router in communication with the host. For example, the data indicates a connection status of the host. In some embodiments, if it is determined that the host has not been effectively notified, a different action attempting to notify the host that its IP address has expired is attempted, if applicable, in a determined hierarchy order. In some embodiments, if it is determined that the host has been effectively notified that its router is unreachable, it is determined that the undesired service has been successfully interdicted.

If at 1108 it is determined that the host cannot be attempted to be notified that the router is unreachable or at 1112 it is determined that host has not been effectively notified that its router is unreachable, at 1114 it is determined whether a router of the host of the undesired service can be attempted to be notified to disconnect the host. In some embodiments, determining whether the router can be attempted to be notified includes determining whether enough information is known and/or authorization exists to determine and notify the router in connection with the host. For example, it is determined whether enough information is known about a connection, router(s), host, and/or operating system associated with the service in order to attempt to notify the router in connection with the host. In another example, it is determined whether an authorization can be provided to the router to control the router's connection with the host. In some embodiments, determining whether the router can be attempted to be notified includes determining whether the host and/or undesired service is vulnerable to a disconnection from the router and/or whether the router is vulnerable to the disconnection notification.

If at 1114 it is determined that the router can be attempted to be notified, at 1116, the router is attempted to be notified to disconnect the host. In some embodiments, attempting to notify the router includes providing a message to the router to disconnect the host. This may cause the host to stop all network communications and attempt to find another router. If the host attempts to reconnect with the router, the router may deny the connection from the host. In some embodiments, a plurality of routers is notified to disconnect and/or not allow connections with the host. In some embodiments, attempting to notify the router includes authenticating with the router. For example, an authorization credential is provided to the router.

At 1118, it is determined whether the router has been effectively notified. In some embodiments, determining whether the router has been effectively notified includes attempting to communicate with the host. For example, if a communication (e.g., a new connection) with the host cannot be established, it is determined that the router has been effectively notified that its router is unreachable. In some embodiments, determining whether the router has been effectively notified includes analyzing data (e.g., router connection information) provided by the host and/or the router in communication with the host. For example, the data indicates current connections of the router and/or host. In some embodiments, if it is determined that the router has not been effectively notified, a different action attempting to notify the router to disconnect/not allow the host is attempted, if applicable, in a determined hierarchy order. In some embodiments, determining whether the router has been effectively notified includes determining whether a confirmation message has been received from the router and/or an authentication has been established with the router. In some embodiments, if the router has been effectively notified, it is determined that the service has been successfully interdicted.

If at 1114 it is determined that the router cannot be attempted to be notified or at 1118 it is determined that the router has not been effectively notified, at 1120 it is determined whether it can be attempted to spoof the host to a router of the host. For example, it is determined whether to attempt to spoof the router of the host to cause the router to disconnect the host. In some embodiments, determining whether the host spoofing can be attempted includes determining whether enough information is known to spoof the host. For example, it is determined whether enough information is known about a connection, router(s), host, and/or operating system associated with the host in order to attempt to spoof the host. In some embodiments, it is determined whether a communication can be sent to a router in connection with the host in a manner that makes it seem as if the communication was provided by the host when in fact it originated from a different source (e.g., interdiction model 130 of FIG. 1). In some embodiments, determining whether it can be attempted to spoof the host to the router of the host includes determining whether the host is vulnerable to the router disconnecting the host (e.g., disabled due to the router).

If at 1120 it is determined that it can be attempted to spoof the host to the router, at 1122, the host is attempted to be spoofed to the router. In some embodiments, attempting to spoof the host includes sending a message/packet to the router in a manner that seems as if the message/packet originated from the host even though the communication originated from another network node. In some embodiments, the spoofed communication sent to the host includes an error. The error may cause the router to believe the host is not functioning properly and disconnect and/or not allow future connections from the host. Examples of the error in the spoofed communication includes malformed data/packet, a too large data size (e.g., size of data in the communication packet exceeds a packet window size), and an improper communication rate (e.g., the communication packet set too frequently to request a new IP address).

At 1124, it is determined whether the host has been effectively spoofed to the router. In some embodiments, determining whether the host has been effectively spoofed to the router includes determining whether the host is able to connect to the router. For example, if the host is able to connect to the router, the host has not been effectively spoofed and if the host is not able to connect to the router, the host has been effectively spoofed. In some embodiments, determining whether the host has been effectively spoofed includes attempting to communicate with the host. For example, if a communication (e.g., a new connection) with the host cannot be established, it is determined that the host has been effectively spoofed. In some embodiments, determining whether the host has been effectively spoofed includes analyzing data (e.g., router connection information) provided by the host and/or a router in communication with the host. For example, the data indicates the current connections of the router and whether the host is currently connected to the router. In some embodiments if it is determined that the host has not been effectively spoofed, a different action attempting to spoof the host to its router is attempted, if applicable, in a determined hierarchy order. In some embodiments, if it is determined that the host has been effectively spoofed, it is determined that the service has been successfully interdicted.

If at 1120 it is determined that it cannot be attempted to spoof the host to the router, or at 1124, it is determined that the host has not been effectively spoofed to the router, at 1126, an indication is provided that the host could not be denied. For example, an error message is provided and in the process of FIG. 9, the process proceeds from 924 to 926.

If at 1106, 1112, 1118, or 1124 it is determined that the service has been successfully denied, at 1128, a success indication is provided. In some embodiments, the provided indication identifies how the host was denied. In some embodiments, in the process of FIG. 9, the process proceeds from 924 to 928.

The process of FIG. 11 shows an example hierarchy of vulnerabilities of the service and corresponding hierarchy of actions to be performed in an attempt to deny the host of the service. For example, first, IP address of the host is attempted to be expired, second, the host is attempted to be notified that its router is unreachable, third, a router of the host is attempted to be notified to disconnect the host, and fourth, the host is attempted to be spoofed to a router of the host to cause the router to disconnect the host. The example shown in FIG. 11 is only one example of a hierarchy order. In other embodiments the ordering/hierarchy of the elements of FIG. 11 may be different and/or other elements may exist.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for interdicting an undesired service, comprising:
    a processor configured to identify the undesired service and identify a vulnerability of the undesired service, wherein the identified undesired service is associated with a malicious code, the vulnerability of the identified undesired service has been identified for the identified undesired service after the identified undesired service has been identified; and
    a communication interface coupled with the processor and configured to interdict the undesired service according to the vulnerability, wherein interdicting the undesired service includes affecting a network capability of the undesired service.

2. The system of claim 1, wherein the system is not a part of a host hosting the undesired service.

3. The system of claim 1, wherein identifying the vulnerability of the undesired service includes identifying the vulnerability based on whether the undesired service is vulnerable to the vulnerability.

4. The system of claim 1, wherein identifying the undesired service includes sending to a communication port of the undesired service a predetermined interrogation packet that invites an expected action and detecting the expected action.

5. The system of claim 1, wherein affecting the network capability of the undesired service includes stopping the undesired service.

6. The system of claim 1, wherein affecting the network capability of the undesired service includes disabling a network communication of the undesired service.

7. The system of claim 1, wherein affecting the network capability of the undesired service includes disabling a network communication of a host hosting the undesired service.

8. The system of claim 1, wherein affecting the network capability of the undesired service includes providing a termination command to the undesired service.

9. The system of claim 1, wherein affecting the network capability of the undesired service includes identifying the undesired service to a host protection program operating on a host of the undesired service.

10. The system of claim 1, wherein affecting the network capability of the undesired service includes performing a denial of service attack on the undesired service to deny an operation of a malware.

11. The system of claim 1, wherein affecting the network capability of the undesired service includes attempting to occupy all available network connections of the undesired service.

12. The system of claim 1, wherein affecting the network capability of the undesired service includes reducing a communication rate of the undesired service.

13. The system of claim 1, wherein affecting the network capability of the undesired service includes performing one or more of the following actions to a host hosting the undesired service: expiring an IP address of the host, informing the host that a router is unreachable, instructing a router to disconnect the host, spoofing the host to cause a router to disconnect the host, and isolating the host from network communication.

14. A method for interdicting an undesired service, comprising:
    identifying the undesired service;
    using a processor to identify a vulnerability of the undesired service, wherein the identified undesired service is associated with a malicious code, the vulnerability of the identified undesired service has been identified for the identified undesired service after the identified undesired service has been identified; and interdicting the undesired service according to the vulnerability, wherein interdicting the undesired service includes affecting a network capability of the undesired service.

15. The method of claim 14, wherein identifying the undesired service includes sending to a communication port of the undesired service a predetermined interrogation packet that invites an expected action and detecting the expected action.

16. The method of claim 14, wherein affecting the network capability of the undesired service includes disabling a network communication of a host hosting the undesired service.

17. The method of claim 14, wherein affecting the network capability of the undesired service includes performing a denial of service attack on the undesired service to deny an operation of a malware.

18. The method of claim 14, wherein affecting the network capability of the undesired service includes attempting to occupy all available network connections of the undesired service.

19. The method of claim 14, wherein affecting the network capability of the undesired service includes reducing a communication rate of the undesired service.

20. A computer program product for interdicting an undesired service, the computer program product being embodied in a non-transitory computer readable storage medium and comprising computer instructions for:

identifying the undesired service;

identifying a vulnerability of the undesired service, wherein the identified undesired service is associated with a malicious code, the vulnerability of the identified undesired service has been identified for the identified undesired service after the identified undesired service has been identified; and interdicting the undesired service according to the vulnerability, wherein interdicting the undesired service includes affecting a network capability of the undesired service.

* * * * *